US012222939B2

(12) United States Patent
Siddiqui et al.

(10) Patent No.: US 12,222,939 B2
(45) Date of Patent: Feb. 11, 2025

(54) SYSTEMS AND METHODS FOR ACCELERATING AND OPTIMIZING GROUPWISE COMPARISON IN RELATIONAL DATABASES

(71) Applicant: Microsoft Technology Licensing, LLC, Redmond, WA (US)

(72) Inventors: Tarique Ashraf Siddiqui, Redmond, WA (US); Surajit Chaudhuri, Kirkland, WA (US); Vivek Ravindranath Narasayya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 98 days.

(21) Appl. No.: 17/833,176

(22) Filed: Jun. 6, 2022

(65) Prior Publication Data
US 2023/0394041 A1 Dec. 7, 2023

(51) Int. Cl.
*G06F 16/24* (2019.01)
*G06F 16/2453* (2019.01)

(52) U.S. Cl.
CPC .. *G06F 16/24537* (2019.01); *G06F 16/24542* (2019.01)

(58) Field of Classification Search
CPC .............. G06F 16/24537; G06F 16/24542
See application file for complete search history.

(56) References Cited

U.S. PATENT DOCUMENTS

| | | | |
|---|---|---|---|
| 8,015,454 B1* | 9/2011 | Harrison | G06F 11/3447 714/47.3 |
| 2012/0084081 A1* | 4/2012 | Melamed | G06F 16/3344 704/211 |
| 2015/0019530 A1* | 1/2015 | Felch | G06F 16/3326 707/719 |
| 2016/0292157 A1* | 10/2016 | Zhang | G06Q 50/10 |
| 2017/0199886 A1* | 7/2017 | Perrine | G06F 16/9537 |
| 2019/0220464 A1* | 7/2019 | Butani | G06F 16/283 |
| 2019/0347260 A1* | 11/2019 | Li | G06F 16/24535 |

(Continued)

OTHER PUBLICATIONS

Chaudhuri, et al., "Evaluating Top-K Selection Queries", In Proceedings of the 25th VLDB Conference, Sep. 7, 1999, 12 Pages.
(Continued)

*Primary Examiner* — Mohammad S Rostami
(74) *Attorney, Agent, or Firm* — NovoTechIP International PLLC

(57) ABSTRACT

A system and method for executing SQL statements includes receiving an SQL statement for comparing two trendsets over a relation using a scoring function, each of the trendsets including one or more trends, each of the trends being designated by a constraint and a grouping-measure combination, wherein comparing the trendsets includes identifying trend pairs for comparison, each of the trend pairs including a trend from the each of the trendsets having a common grouping-measure combination. The SQL statement is transformed into a basic plan of existing logical operators for performing the SQL statement. A set of sub-plans is determined based on the basic plan. Pairs of sub-plans are merged to generate a set of merged sub-plans. A cost for each of the merged sub-plans is determined. The merged sub-plan having the lowest cost is used to execute the SQL statement.

17 Claims, 13 Drawing Sheets

(56) References Cited

U.S. PATENT DOCUMENTS

| | | | |
|---|---|---|---|
| 2022/0027367 A1* | 1/2022 | Ramachandra | G06F 8/4441 |
| 2022/0067037 A1* | 3/2022 | Ranganathan | G10L 15/22 |
| 2022/0405281 A1* | 12/2022 | Govindan | G06F 16/2453 |
| 2023/0328021 A1* | 10/2023 | Sharma | H04L 51/52 |
| | | | 709/206 |
| 2023/0328086 A1* | 10/2023 | Kapoor | G06F 9/455 |
| | | | 726/23 |
| 2023/0359614 A1* | 11/2023 | Oattes | G06F 16/211 |

OTHER PUBLICATIONS

"Statistical Computing Statistical Graphics", Retrieved From : https://web.archive.org/web/20151018125450/http://stat-computing.org/dataexpo/2009/the-data.html, Oct. 18, 2015, 2 Pages.

"Explained Data Tableau Software", Retrieved From : https://web.archive.org/web/20200212160857/https://www.tableau.com/products/new-features/explain-data, Feb. 20, 2020, 7 Pages.

"Power BI", Retrieved From: https://web.archive.org/web/20190602195334/https://powerbi.microsoft.com/en-us/, Jun. 2, 2019, 7 Pages.

"Tableau Public", Retrieved From : https://web.archive.org/web/20191111023749/https://public.tableau.com/s/, Nov. 11, 2019, 5 Pages.

Abuzaid, et al., "Diff: A Relational Interface for Large-Scale Data Explanation", In Proceedings of the VLDB Endowment, vol. 12, Issue 4, Dec. 1, 2018, pp. 419-432.

Agarwal, et al., "On the Computation of Multidimensional Aggregates", In Proceedings of the 22nd VLDB Conference, vol. 96, 1996, pp. 506-521.

Agrawal, et al., "Efficient Similarity Search in Sequence Databases", In Proceedings of International conference on foundations of data organization and algorithms, Oct. 13, 1993, 15 Pages.

Arasu,, et al., "Efficient Exact Set-Similarity Joins", In the Proceedings of the 32nd International Conference on Very Large Data Bases, Sep. 12, 2006, pp. 918-929.

Bohm, et al., "A Cost Model and Index Architecture for the Similarity Join", In Proceedings of 17th International Conference on Data Engineering, Apr. 2, 2001, 10 Pages.

Bohm, et al., "The K-Nearest Neighbour Join: Turbo Charging the Kdd Process", In Journal of Knowledge and Information Systems, vol. 6, Issue 6, Nov. 6, 2004, pp. 728-749.

Buono, et al., "Interactive Pattern Search in Time Series", In Proceedings of Visualization and Data Analysis, vol. 5669, Mar. 11, 2005, pp. 175-187.

Chatziantoniou, et al., "Querying Multiple Features of Groups in Relational Databases", In Proceedings of 22nd VLDB Conference, vol. 96, Sep. 3, 1996, pp. 295-306.

Chatziantoniou, Damianos, "Using Grouping Variables to Express Complex Decision Support Queries", In Journal of Data & Knowledge Engineering, vol. 61, Issue 1, Apr. 2007, pp. 114-136.

Chaudhuri, et al., "A Primitive Operator for Similarity Joins in Data Cleaning", In Proceedings of 22nd International Conference on Data Engineering, Apr. 3, 2006, 12 Pages.

Chen, et al., "Efficient Computation of Multiple Group by Queries", In Proceedings of the ACM SIGMOD International Conference on Management of Data, Jun. 14, 2005, pp. 263-274.

Cunningham, et al., "PIVOT and UNPIVOT: Optimization and Execution Strategies in an RDBMS", In Proceedings of the Thirtieth International Conference on Very Large Data Bases—vol. 30, Aug. 31, 2004, pp. 998-1009.

Ding, et al., "Quickinsights: Quick and automatic Discovery of Insights from Multi-Dimensional Data", In Proceedings of the 2019 International Conference on Management of Data, Jun. 25, 2019, pp. 317-332.

Dsilva, et al., "AIDA: Abstraction for Advanced in-Database Analytics", In Proceedings of the VLDB Endowment, vol. 11, Issue 11, Aug. 2018, pp. 1400-1413.

Gravano, et al., "Approximate String Joins in a Database (almost) for Free.", In Proceedings of the 27th VLDB Confere, Sep. 11, 2001, 10 Pages.

Gray, et al., "Data cube: A Relational Aggregation Operator Generalizing Group-by, Cross-Tab, and Sub Totals.", In Journal of Data Mining and Knowledge Discovery, Jan. 1997, pp. 29-53.

Han, et al., "DMQL: A Data Mining Query Language for Relational Databases", In Proceedings of ACM SIGMOD International Conference on Management of Data, Jun. 4, 1996, 7 Pages.

Illyas, et al., "Supporting Top-k Join Queries in Relational Databases", In Journal of the 29th International Conference on Very Large Databases, vol. 13, Issue 3, Sep. 13, 2004, pp. 207-221.

Ilyas, et al., "A Survey of Top-k Query Processing Techniques in Relational Database Systems", In Journal of ACM Computing Surveys, vol. 40, Issue 4, Oct. 1, 2008, 58 Pages.

Imielinski, et al., "MSQL: A Query Language for Database Mining", In Journal of Data Mining and Knowledge Discovery, vol. 3, Issue 4, Dec. 3, 1999, pp. 373-408.

Kluyver, et al., "Jupyter Notebooks—a Publishing Format for reproducible computational workflows", In Proceedings of 20th International Conference on Electronic Publishing, May 26, 2016, pp. 87-90.

Lee, et al., "You Can't Always Sketch What You Want: Understanding Sensemaking in Visual Query Systems", In Proceedings of IEEE Transactions on Visualization and Computer Graphics, vol. 26, Issue 1, Jan. 2020, pp. 1267-1277.

Li, et al., "Ranksql: Query Algebra and Optimization for Relational Top-K Queries", In Proceedings of the 2005 ACM SIGMOD International Conference on Management of Data, Jun. 14, 2005, pp. 131-142.

Lin, et al., "Fast Similarity Search in the Presence of Noise, Scaling, and Translation in Time-Series Databases", In Proceeding of the 21th International Conference on Very Large Data Bases, Sep. 11, 1995, 490-501.

Macke, et al., "Adaptive Sampling for Rapidly Matching Histograms", In Proceedings of the VLDB Endowment, vol. 11, Issue 10, Aug. 20, 2017, pp. 1262-1275.

Nambiar, et al., "The Making of TPC-DS", In Proceedings of VLDB Endowment, Sep. 12, 2006, pp. 1049-1058.

Netz, et al., "Integrating Data Mining with SQL Databases: OLE DB for Data Mining", In Proceedings of 17th International Conference on Data Engineering, Apr. 2, 2001, 9 Pages.

Papadias, et al., "Aggregate Nearest Neighbor Queries in Spatial Databases", In Journal of ACM Transactions on Database Systems (TODS), vol. 30, Issue 2, Jun. 1, 2005, pp. 529-576.

Rafiei, et al., "Similarity-Based Queries for Time Series Data", In Proceedings of the 1997 ACM SIGMOD International Conference on Management of Data, Jun. 1, 1997, pp. 13-25.

Rajaraman, et al., "Finding Similar Items", In Book of Mining of Massive Datasets Chapter-3, Cambridge University Press, 2010, pp. 73-80.

Ramasamy, et al., "Set Containment Joins: The Good, the Bad and the Ugly", In Proceedings of the 26th VLDB Conference, Sep. 10, 2000, pp. 351-362.

Rao, et al., "Providing Better Support for a Class of Decision Support Queries", In Journal of ACM SIGMOD Record, vol. 25, Issue 2, Jun. 1, 1996, pp. 217-227.

Sarawagi, et al., "Efficient set joins on similarity predicates", In Proceedings of the 2004 ACM SIGMOD International Conference on Management of Data, Jun. 13, 2004, 12 pages.

Sarawagi, Sunita, "Explaining Differences in Multidimensional Aggregates", In Proceedings of the 25th International Conference on Very Large Data Bases, Sep. 7, 1999, 12 Pages.

Sarawagi, et al., "i3: Intelligent, Interactive Investigation of Olap Data Cubes", In Journal of ACM SIGMOD Record, vol. 29, Issue 2, May 16, 2000, p. 589.

Scott, et al., "Sturges' Rule", In Journal of Wiley Interdisciplinary Reviews: Computational Statistics, vol. 1, Issue 3, Nov. 1, 2009, pp. 303-306.

Siddiqui, et al., "COMPARE: Accelerating Groupwise Comparison in Relational Databases for Data Analytics (Extended Version)", In Repository of arXiv:2107.11967v2, Jul. 27, 2021, 15 Pages.

(56) References Cited

OTHER PUBLICATIONS

Siddiqui, et al., "Effortless Data Exploration with Zenvisage: an Expressive and Interactive Visual Analytics System", In Proceedings of the VLDB Endowment, vol. 10, Issue 4, Apr. 12, 2016, pp. 457-468.

Tang, et al., "Similarity Group-by Operators for Multi-Dimensional Relational Data", In Journal of IEEE Transactions on Knowledge and Data Engineering, vol. 28, Issue 2, Feb. 2016, 14 Pages.

Tang, et al., "Towards Democratizing Relational Data Visualization", In Proceedings of the International Conference on Management of Data, Jun. 25, 2019, pp. 2025-2030.

Tsaparas, et al., "Ranked Join Indices", In Proceedings 19th International Conference on Data Engineering, Mar. 5, 2003, pp. 277-288.

Vartak, et al., "SEEDB: Efficient Data-Driven Visualization Recommendations to Support Visual Analytics", In Proceedings of the VLDB Endowment, vol. 8, Issue 13, Sep. 2015, pp. 2182-2193.

Wattenberg, Martin, "Sketching a Graph to Query a Time-Series Database", In Proceeding of the CHI'01 Extended Abstracts on Human Factors in Computing Systems, Mar. 31, 2001, pp. 381-382.

Wongsuphasawat, et al., "Voyager 2: Augmenting Visual Analysis with Partial View Specifications", In Proceedings of the 2017 Chi Conference on Human Factors in Computing Systems, May 6, 2017, pp. 2648-2659.

Wu, et al., "The Case for Data Visualization Management Systems: Vision Paper.", In Proceedings of the VLDB Endowment, Jun. 1, 2014, pp. 903-906.

Zaharioudakis, "Answering Complex Sql Queries Using Automatic Summary Tables.", In Proceedings of the ACM SIGMOD International Conference on Management of Data, May 16, 2000, pp. 105-116.

Zhang, et al., "Management Methods of Spatial Data Based on Postgis", In Proceedings of the Second Pacific-Asia Conference on Circuits, Communications and System, Aug. 1, 2010, pp. 410-413.

\* cited by examiner

```
SELECT A.region, A.city, A. week, A. revenue, ..., A.county, B.score
FROM sales A,
        // Compares subsets of tuples (e.g., one each for cities in Asia and Europe) over
          n pairs of attributes
        (SELECT T.region, T.city, T. week, ..., T2.county, T.c1, T.c2, score
            (
                // Compares subsets of tuples for attribute combination 1 (week, revenue)
                  outputs subsets with most similar trends
                SELECT  T2.region, T2.city, T2. week, T2. revenue, T1.c1, T1.c2,
                        T1.score, NULL AS profit, NULL AS country, ...
                FROM (SELECT c1, c2, SUM(diff) AS score
                        FROM (
                            SELECT s.city AS c1, r.city AS c2, s.week AS week,
                             POW((AVG(s.revenue) - AVG(r.revenue)), 2) AS diff
                            FROM sales s, sales r
Subquery 1              WHERE s.region = `Asia` AND r.region=`Europe`
                                    AND s.week=r.week
                            GROUP BY c1, c2, week)
                        GROUP BY c1, c2
                        ORDER BY score ASC) T1,
                sales T2
                WHERE T1. c1 = T2.city OR T1.c2 =T2.city
            UNION
            // Subquery 2 for attribute combination 2 (similar to subquery 1)
            UNION
            ...
            UNION
            // Subquery n for attribute combination n (similar to subquery 1)
            ) T
        GROUP BY c1, c2, score
        ORDER BY score ASC
        LIMIT 1) B,
WHERE A.city = B.city
```

FIG. 1

| 18 | 18 | 14 | 18 | 18 | 16 | 14 | 14 | 0 | 14 | 12 | 10 | 13 | 13 | 14 | 14 |

Score = 1717

| 26 | 23 | 23 | 29 | 30 | 28 | 24 | 25 | 27 | 24 | 24 | 20 | 21 | 25 | 20 | 22 |

Exact score on comparing two trends

FIG. 8A

| 16, 229, 10, 18 |

Bounds = [1700, 6400]

| 16, 304, 20, 30 |

Bounds on score using a single summary

FIG. 8B

| 8, 129, 13, 18 | 8, 100, 10, 14 |

Bounds = [1702, 4624]

| 8, 211, 23, 30 | 8, 183, 20, 27 |

Bounds on score using two-segment summaries

FIG. 8C

(a) Comparison with Baselines (b) Ablative analysis quantifying the impact of each optimization. Each optimization is successively turned on from left to right.

(a) Varying number of trends with fixed (grouping, measure)

(b) Varying number of (grouping, measure)

(c) Increasing number of trends with proportional decrease in trend size over a fixed data of size $10^6$

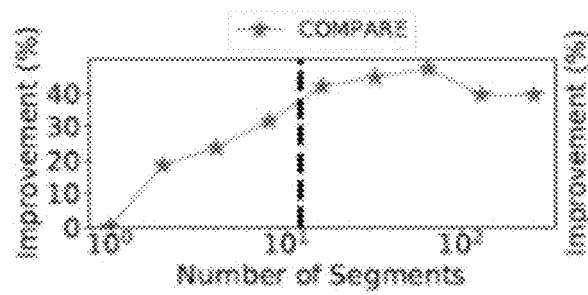
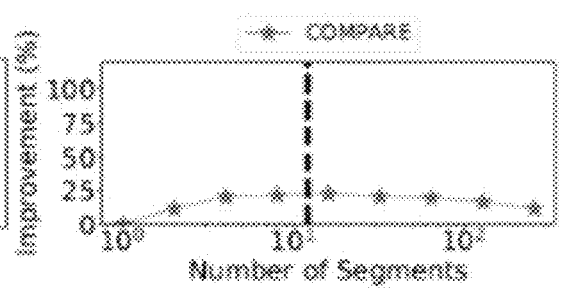
FIG. 11A    FIG. 11B
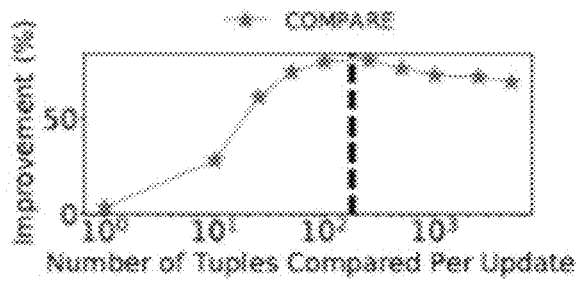
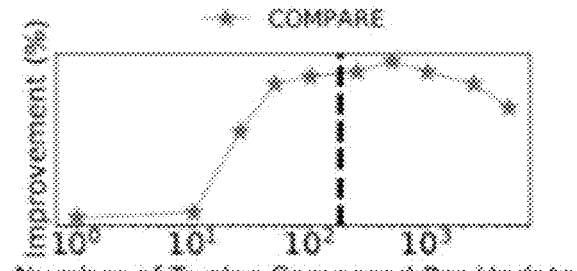
FIG. 12A    FIG. 12B

SYSTEMS AND METHODS FOR ACCELERATING AND OPTIMIZING GROUPWISE COMPARISON IN RELATIONAL DATABASES

BACKGROUND

Comparing subsets of data is an important part of data exploration, routinely performed by data scientists to find unusual patterns and gain actionable insights. For instance, market analysts often compare products over different attribute combinations (e.g., revenue over week, profit over week, profit over country, quantity sold over week, etc.) to find the ones with similar or dissimilar sales. However, as the size and complexity of the dataset increase, this manual enumeration and comparison of subsets becomes challenging. To address this, a number of visualization tools have been proposed that automatically compare subsets of data to find the ones that are relevant. Unfortunately, most of these tools perform comparison of subsets in a middleware. With an increase in size and number of attributes in the dataset, these tools incur large data movement as well as serialization and deserialization overheads, resulting in poor latency and scalability.

One challenge faced in comparing subsets of data is implementing such a comparison within a relational database. An option for in-database execution is to extend the database management system (DBMS) with custom user-defined functions (UDFs) for comparing subsets of data. However, UDFs incur invocation overhead and are executed as a batch of statements where each statement is run sequentially with limited resources (e.g., parallelism, memory). As such, the performance of UDFs does not scale with the increase in the number of tuples. Furthermore, UDFs have limited interoperability with other operators, and are less amenable to logical optimizations, e.g., PK-FK join optimizations over multiple tables.

While comparative queries can be expressed using regular SQL, such queries require complex combination of multiple subqueries. The complexity makes it hard for relational databases to find efficient physical plans, resulting in poor performance. While previously known methods have proposed extensions, such as grouping variables, e.g., GROUPING SETs, CUBE, etc., expressing and optimizing grouping and comparison simultaneously remains a challenge. Consider a market analyst exploring sales trends across different cities. The analyst generates a sample of visualizations depicting different trends, e.g., average revenue over week, average profit over week, average revenue over country, etc., for a few cities. She notices that trends for cities in Europe look different from those in Asia. To verify whether this observation generalizes, she looks for a counterexample by searching for pairs of attributes over which two cities in Asia and Europe have most similar trends. Often, an $L_p$ norm-based distance measure (e.g., Euclidean distance, Manhattan distance) that measures deviation between trends and distributions is used for such comparisons.

FIG. 1 depicts a SQL query template for the above example. The query involves multiple subqueries, one for each attribute pair. Within each subquery, subsets of data (one for each city) are aggregated and compared via a sequence of self-join and aggregation functions that compute the similarity (i.e., sum of squared differences). Finally, a join and filter is performed to output the tuples of subsets with minimum scores. Clearly, the query is quite verbose and complex, with redundant expressions across subqueries. While comparative queries often explore and compare a large number of attribute pairs, even with only a few attribute pairs, the SQL specification can become extremely long.

Furthermore, the number of groups to compare can often be large depending on the number of possible constraints (e.g., cities), pairs of attributes, and aggregation functions, and this number can grow significantly with the increase in dataset size or number of attributes. This results in many subqueries with each subquery taking a substantially long time to execute. While there are large opportunities for sharing computations (e.g., aggregations) across subqueries, relational engines execute subqueries for each attribute-pair separately resulting in substantial overhead in both runtime as well as storage. Furthermore, as depicted in subquery 1 in FIG. 1, while each pair of groups (e.g., set of tuples corresponding to each city) can be compared independently, the relational engines perform an expensive self-join over a large relation consisting of all groups. The cost of doing this increases super-linearly as the number and size of subsets increases (discussed in more detail below). Finally, in many cases, all that is needed is the aggregated result for each comparison. However, the join results in large intermediate data, e.g., one tuple for each pair of matching tuples between the two sets, resulting in substantial overheads.

Hence, what is needed are systems and methods that enable a DBMS to efficiently perform comparisons between subsets of data within relational databases.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1 shows an SQL query for comparing subsets of data over different attribute combinations.

FIG. 8A shows the exact score on comparing two trends.

FIG. 8B shows the bounds on score using a single segment summary.

FIG. 8C shows the bounds on score using two-segment summaries.

FIGS. 11A and 11b depict graphs showing the impact on improvement when varying the number of segment-aggregates on $Q_2$ and $Q_4$, respectively.

FIGS. 12A and 12b depict graphs showing the impact on improvement when varying the number of tuples comparted per updated during early termination on $Q_2$ and $Q_4$, respectively.

SUMMARY

Figure 2:
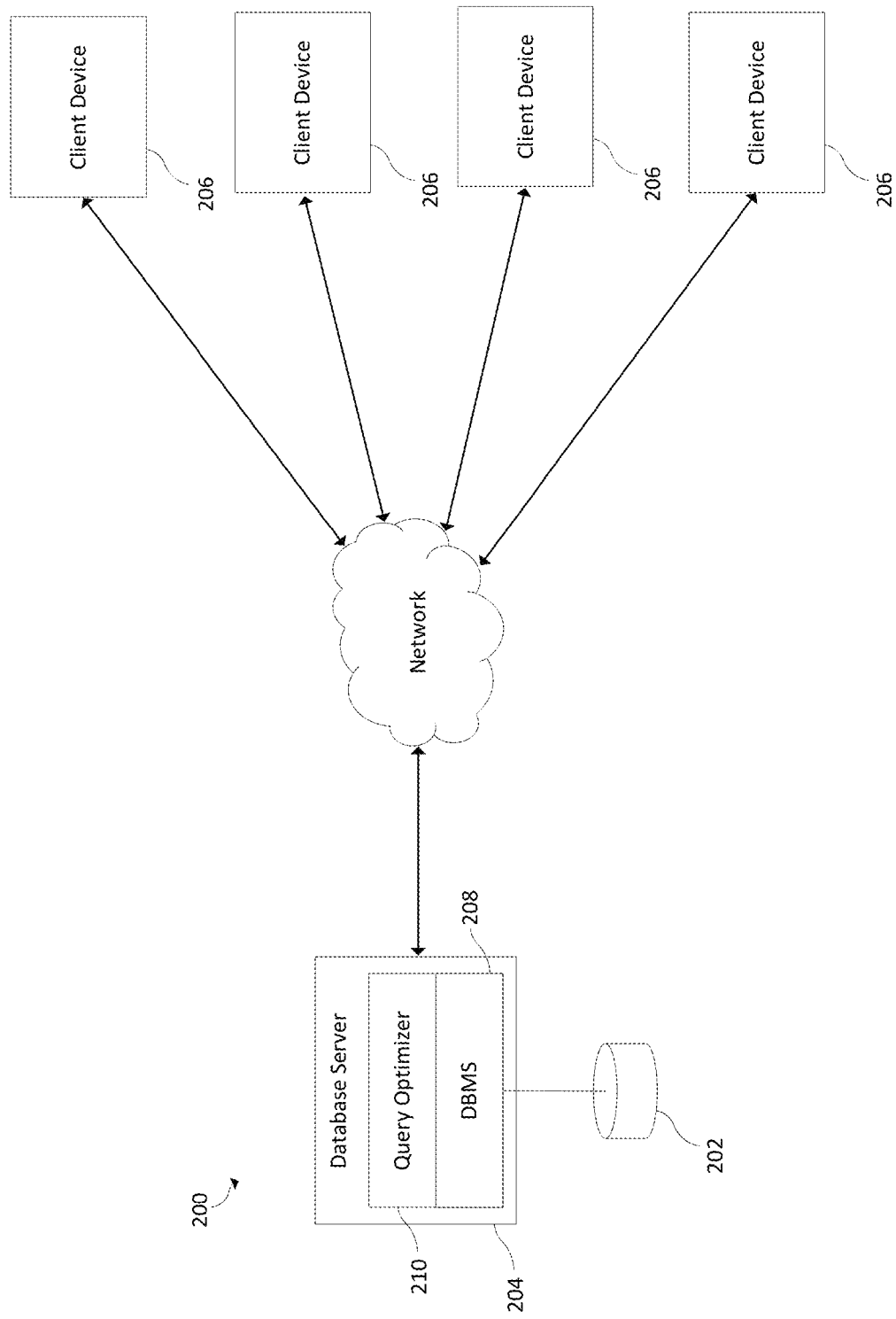
FIG. 2 depicts an example system upon which aspects of this disclosure may be implemented.

In one general aspect, the instant disclosure presents a data processing system having a processor and a memory in communication with the processor wherein the memory stores executable instructions that, when executed by the processor, cause the data processing system to perform multiple functions. The functions may include receiving an SQL statement for comparing a first trendset to a second trendset over a relation in a database using a scoring function, each of the first and the second trendsets including one or more trends, each of the trends being designated by a constraint and a grouping-measure combination, wherein comparing the first and the second trendsets includes identifying trend pairs for comparison, each of the trend pairs including a trend from the first trendset and a trend from the second trendset having a common grouping-measure combination; transforming the SQL statement into a basic plan of existing logical operators for performing the SQL statement using a query optimizer; determining a set of sub-plans based on the basic plan, the set of sub-plans having one sub-plan for each grouping-measure combination, each of the sub-plans including a sequence of group-by aggregate, join and partition operations over one of the respective grouping-measure combinations; merging pairs of sub-plans from the set of sub-plans by merging group by aggregates and using vertical and horizontal partitioning to generate a set of merged sub-plans; determining a respective cost for each of the merged sub-plans based on costs of physical operators used to perform each of the merged sub-plans using the query optimizer; and using the merged sub-plan having lowest cost to execute the SQL statement.

In yet another general aspect, the instant disclosure presents a method of executing SQL statements using a database management system (DBMS). The method comprise receiving an SQL statement for comparing trends in the first trendset to trends in the second trendset over a relation in a database using a scoring function, each of the first and the second trendsets including one or more trends, each of the trends being designated by a constraint and a grouping-measure combination, wherein comparing the first and the second trendsets includes identifying trend pairs for comparison, each of the trend pairs including a trend from the first trendset and a trend from the second trendset having a common grouping-measure combination; transforming the SQL statement into a basic plan of existing logical operators for performing the SQL statement using a query optimizer; determining a set of sub-plans based on the basic plan, the set of sub-plans having one sub-plan for each grouping-measure combination, each of the sub-plans including a sequence of group-by aggregate, join and partition operations over one of the respective grouping-measure combinations; merging pairs of sub-plans from the set of sub-plans by merging group by aggregates and using vertical and horizontal partitioning to generate a set of merged sub-plans; determining a respective cost for each of the merged sub-plans based on costs of physical operators used to perform each of the merged sub-plans using the query optimizer; and using the merged sub-plan having lowest cost to execute the SQL statement.

In a further general aspect, the instant application describes a non-transitory computer readable medium on which are stored instructions that when executed cause a programmable device to perform functions of receiving an SQL statement for comparing trends in the first trendset to trends in the second trendset over a relation in a database using a scoring function, each of the first and the second trendsets including one or more trends, each of the trends being designated by a constraint and a grouping-measure combination, wherein comparing the first and the second trendsets includes identifying trend pairs for comparison, each of the trend pairs including a trend from the first trendset and a trend from the second trendset having a common grouping-measure combination; transforming the SQL statement into a basic plan of existing logical operators for performing the SQL statement using a query optimizer; determining a set of sub-plans based on the basic plan, the set of sub-plans having one sub-plan for each grouping-measure combination, each of the sub-plans including a sequence of group-by aggregate, join and partition operations over one of the respective grouping-measure combinations; merging pairs of sub-plans from the set of sub-plans by merging group by aggregates and using vertical and horizontal partitioning to generate a set of merged sub-plans; determining a respective cost for each of the merged sub-plans based on costs of physical operators used to perform each of the merged sub-plans using the query optimizer; and using the merged sub-plan having lowest cost to execute the SQL statement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As discussed above, data analysis often involves comparing subsets of data across many dimensions for finding unusual trends and patterns. While the comparison between subsets of data can be expressed using SQL, such queries tend to be very complex to write, and suffer from poor performance over large and high-dimensional datasets. To address these technical problems and more, in an example, this description provides technical solutions in the form of a new logical operator and extensions to the SQL language, as well as optimizations in relational databases for performing comparative queries.

As will be understood by persons of skill in the art upon reading this disclosure, benefits and advantages provided by such implementations can include, but are not limited to, a technical solution to the technical problems associated with comparative queries in relational databases in the form of a new logical operator and extensions to the SQL language, as well as optimizations in relational databases, described below. More specifically, a new logical operator COMPARE (Φ) for relational databases is described that concisely captures the enumeration and comparison between subsets of data and greatly simplifies the expressing of a large class of comparative queries. In addition, the database engine is extended with optimization techniques that exploit the semantics of COMPARE to significantly improve the performance of such queries.

Figure 3:
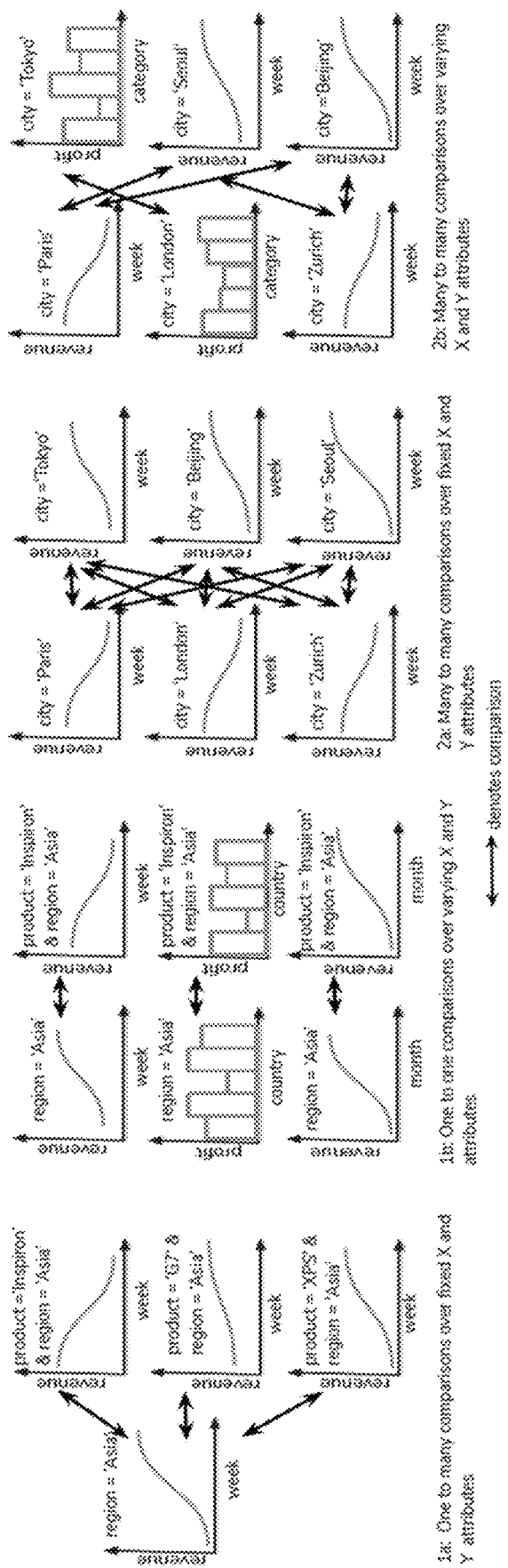
FIG. 3 illustrates the comparative queries with regard to example 1a, example 1b, example 2a, and example 2b discussed in the specification.

The COMPARE operator is a first lass relational construct with formalized semantics that help capture a large class of frequently used comparative queries. Extensions to SQL syntax are provided that allow intuitive and more concise specification of comparative queries. For instance, the comparison between two sets of cities $C_1$ and $C_2$ over n pairs of attributes: $(x_1, y_1), (x_2, y_2), \ldots, (x_n, y_n)$ using a comparison function $\mathcal{F}$ can be succinctly expressed as COMPARE $[C_1 <-> C_2]$ $[(x_1, y_1), (x_2, y_2), \ldots, (x_n, y_n)]$ USING $\mathcal{F}$. As shown in FIG. 3, expressing the same query using existing SQL clauses requires a UNION over n subqueries, one for each pair of attributes $(x_i, y_i)$, where each subquery itself tends to be quite complex.

The use of COMPARE reduces the complexity of specifying comparative queries and facilitates optimizations via query optimizer and the execution engine. More specifically, the semantics of COMPARE are exploited share aggregate computations across multiple attribute combinations, as well as partition and compare subsets in a manner that significantly reduces the processing time. While these optimizations work for any comparison function, specific optimizations, such as a new physical operator, are also described that exploit properties of frequently used comparison functions (e.g., $L_p$ norms). These optimizations help prune many subset comparisons without affecting the correctness.

New transformation rules are also introduced that transform the logical tree containing the COMPARE operator along with other relational operators into equivalent logical trees that are more efficient. For instance, the attributes referred to in COMPARE may be spread across multiple tables, involving PK-FK joins between fact and dimension tables. To optimize such cases, COMPARE can be pushed below join which reduces the number of tuples to join. Similarly, this disclosure describes how aggregates can be pushed below COMPARE, how multiple COMPARE operators can reordered, and how an equivalent sub-plan can expressed using existing relational operators.

FIG. 2 illustrates an example system 200, upon which aspects of this disclosure may be implemented. The system 200 includes a relational database 202, a database server 204, and client devices 206. Relational database 202 comprises a set of tables of data along with information about relations between the tables. Tables represent relations over the data. Each table comprises a set of records of data stored in one or more data fields. The records of a table are also referred to as rows, and the data fields of records in a table are also referred to as columns. Database server 204 includes a database management system (DBMS) 208 for processing queries, for example, to retrieve, insert, delete, and/or update data in database 202. DBMS 208 may support any suitable query language, such as Structured Query Language (SQL) for example, to define the queries that may be processed by DBMS 208.

DBMS 208 includes a query optimizer 210 for improving the performance in processing queries. The query optimizer 210 uses database indexes to determine the optimal execution plan for a given query. Indexes are structures used to quickly locate data without having to search every row in a database every time a database is accessed. An index may be based on one or more columns of a database table and includes pointers to the records pertaining to the columns are located. Given a set of available indexes, the query optimizer 210 is configured to process a query with respect to the available indexes to determine the execution plan for the query having the lowest cost. The cost may be a measure of the resources, such as CPU, I/O and memory required to execute the query, the amount of time required to execute the query, and/or based on other type of statistical information.

The client devices 206 enable users to access the database 202 via the DBMS 208. Client devices 206 are computing devices that may be implemented as a portable electronic device, such as a mobile phone, a tablet computer, a laptop computer, a portable digital assistant device, a portable game console, and/or other such devices. While the example implementation illustrated in FIG. 2 includes four client devices, other implementations may include a different number of client devices that may utilize the database 202. Client devices 206 may include client applications for communicating with DBMS 208 and accessing the database 202. For example, client devices 206 may include an application having a user interface that enables users to input SQL statements for processing by the DBMS, such as comparative queries based on the COMPARE operator which are discussed in more detail below.

Comparative queries may be characterized with the help of additional examples which are drawn for the example scenario discussed above in which a market analyst is exploring sales trends of products with the help of visualizations to find unusual patterns. The analyst first looks at a small sample of visualizations, e.g., average revenue over week trends for a few regions (e.g., Asia, Europe) and for a subset of cities and products within each region. She observes some unusual patterns and wants to quickly find additional visualizations that either support or disprove those patterns (without examining all possible visualizations). Note that the term "trend" is used to refer to a set of tuples in a more general sense where both categorical (e.g., country) or ordinal attributes (e.g., week) can be used for ordering or alignment during comparison. The examples below are provided in increasing order of complexity.

FIG. 3 illustrates each of these examples, depicting the differences in how the comparison is performed.

1. Example 1a. The analyst notes that the average revenue over week trends for Asia as well as for a subset of products in that region look similar. As a counterexample, she wants to find a product whose revenue over week trend in Asia is very dissimilar (typically measured using Lp norms) to that of the Asia's overall trend. There are visualization systems that support similar queries.
2. Example 1b. In the above example, the analyst finds that the trend for product 'Inspiron' is different from the overall trend for the region 'Asia.' She finds it surprising and wants to see the attributes for which trends or distributions of Inspiron and Asia deviate the most. More precisely, she wants to compare 'Inspiron' and 'Asia' over multiple pairs of attributes (e.g., average profit over country, average quantity sold over week, . . . , average profit over week) and select the one where they deviate the most.
3. Example 2a. Consider another scenario: the analyst visualizes the revenue trends of a few cities in Asia and in Europe and finds that while most cities in Asia have increasing revenue trends, those in Europe have decreasing trends. Again, as a counterexample to this, she wants to find a pair of cities in these regions where this pattern does not hold, i.e., they have the most similar trends. Such tasks involving search for similar pair of items are ubiquitous in data mining and time series.
4. Example 2b. In the above example, the analyst finds that the output pair of visualizations look different, supporting her intuition that perhaps no two cities in Europe and Asia have similar revenue over week trends. To verify whether this observation generalizes when compared over other attributes, she searches for pairs of attributes (similar to ones mentioned in Example 1b) for which two cities in Asia and Europe have most similar trends or distributions.

The comparative queries in the above examples bring the analyst to a few visualizations that depict a pattern she wants to verify thereby allowing her to skip the tedious and time-consuming process of manual comparison of all possible visualizations. As shown in FIG. 3, each query involves comparisons between two sets of visualizations (referred to herein as Set1 and Set2) to find the ones which are similar or dissimilar. Each visualization depicting a trend is represented via two attributes (X attribute, e.g., week and a Y attribute, e.g., average revenue) and a set of tuples (specified via a constraint, e.g., product='Inspiron').

To formalize the notion of comparative queries so a concise representation may be defined for specifying such queries, the present disclosure makes use of the following definitions:

Definition 1 [Trend]. As used herein, a trend is a set of tuples that are compared together as one unit. Formally, the term "trend" is defined a set of tuples derived from a relation R via the triplet: constraint c, grouping g, measure m such that a trend may be represented as (c)(g, m).

Definition 2 [Constraint]. Given a relation R, a constraint is a conjunctive filter of the form: $(p_1=a_1, p_2=a_2, \ldots, p_n=a_n)$ that selects a subset of tuples from R. Here, $p_1=a_1, p_2=a_2, \ldots, p_n=a_n$ are attributes in R and $a_i$ is a value of $p_i$ in R. One can use 'ALL' to select all values of $p_i$.

Definition 3 [(Grouping, Measure)]. Given a set of tuples selected via a constraint, all tuples with the same value of grouping are aggregated using measure. A tuple in one trend is only compared with the tuple in another trend with the same value of grouping.

In example 1a, (R.region='Asia')(R.week, AVG(R.revenue)) is a trend in Set1, where (region='Asia') is a constraint for the trend and all tuples with the same value of having the grouping value 'week' are aggregated using the measure 'AVG(revenue)'.

As discussed below, a comparative query involves two sets of trends. To formalize this approach, the present disclosure makes use of the following definitions:

Definition 4 [Trendset]. A trendset is a set of trends. A trend in one trendset is compared with a trend in another trendset.

In example 1a, the first trendset consists of a single trend indicated by {(R.region='Asia')(R.week, AVG(R.revenue))}, while the second trendset consists of as many trends as there are unique products in R indicated by {(R.region='Asia', R.product='Inspiron')(R.week, AVG(R.revenue)), (R.region='Asia', R.product='XPS') (R.week, AVG(R.revenue)), . . . , (R.region='Asia', R.product='G7') (R.week, AVG(R.revenue))}.

As is the case in the above example, often a trendset contains one trend for each unique value of an attribute (e.g., p) as a constraint, all sharing the same (grouping, measure) combination. Such a trendset can be succinctly represented using only the attribute name as constraint, i.e., [p] [($g_1$, $m_1$). If $a_1, a_2, \ldots, a_n$ represent all unique values of p, then the trendset may be represented as follows:

$$[p] [g_1, m_1] \Rightarrow \{(p=a_1)(g_1, m_1), (p=a_2)(g_1, m_1), \ldots, (p=a_n)(g_1, m_1)\}$$

(where the arrow "$\Rightarrow$" denotes equivalence).

Similarly, consider a trendset having constraints $p_1$ and $p_2$ where $a_1, a_2, \ldots, a_n$ represents all unique values of $p_1$ and $\beta$ epresents the only value of $p_2$. This trendset may be represented as follows:

$$[p_1, p_2] [[g_1, m_1] \Rightarrow \{(p_1=a_1, p_2=\beta)(g_1, m_1), \ldots, (p_1=a_n, p_2=\beta)(g_1, m_1)\}.$$

Alternatively, a trendset consisting of a number n of different (grouping, measure) combinations but the same constraint (e.g., $p=a_1$) can be succinctly written as follows:

$$[(p=a_1)] [(g_1, m_1), (g_2, m_2) \ldots, (g_n, m_n)] \Rightarrow \{(p=a_1)(g_1, m_1), \ldots, (p=a_1)(g_n, m_n)\}.$$

The comparability of trends is defined as follows:

Definition 5 [Comparability of two trends]. Two trends are comparable if they have the same grouping and measure. For example, trend $t_1$ is represented by triple $(c_1)(g_1, m_1)$, and trend $t_2$ is represented by the triple $(c_1)(g_2, m_2)$. Trend $t_1$ is comparable to trend $t_2$ is if $g_1=g_2$ and $m_1=m_2$.

As an example, a trend (R.product='Inspiron') (R.week, AVG(R.revenue)) and a trend (R.product='XPS')(R.month, AVG(R.profit)) cannot be compared since they differ on grouping and measure whereas a trend (R.product='Inspiron') (R.week, AVG(R.revenue)) and a trend (R.product='XPS')(R.week, AVG(R.revenue)) is comparable since they have the same grouping and measure.

A scorer for scoring trend comparisons is defined as follows:

Definition 6 [Scorer]. Given two trends $t_1$ and $t_2$, a scorer is any function that returns a single scalar value called 'score' measuring how $t_1$ compares with $t_2$.

While any function that satisfies the above definition as a scorer may be accepted, two trends are often compared using distance measures such as Euclidean distance, Manhattan distance. Such functions are also called aggregated distance functions. All aggregated distance functions use a function DIFF(.) which is defined as follows:

Definition 7 [DIFF($m_1$, $m_2$, p)]. Given a tuple with measure value $m_1$ and grouping value $g_i$ in trend $t_1$ and another tuple with measure value $m_2$ and the same grouping value $g_i$, DIFF($m_1$, $m_2$, p)=$|m_1-m_2|^p$, where p=$\in \mathbb{Z}^+$. Tuples with non-matching grouping values are ignored.

Since measures $m_1$ and $m_2$ are clear from the definition of trends $t_1$ and $t_2$ and tuples across trends are compared only when they have same grouping and measure expressions, DIFF($m_1$, $m_2$, p) may be succinctly represented by DIFF(p). An aggregated distance function is defined as follows:

Definition 8 [Aggregated Distance Function]. An aggregated distance function compares trends $t_1$: $(c_i)(g_1, m_i)$ and $t_1$: $(c_i)(g_1, m_i)$ in two steps: (i) first DIFF(p) is computed between each pair of tuples from $t_1$ and 2 having the same values of $g_i$, and (ii) all values of DIFF(p) are aggregated using an aggregate function AGG such as SUM, AVG, MIN, and MAX to return a score. An aggregated distance function may therefore be represented as AGG OVER DIFF(p).

For example, $L_p$ norms[2] such as Euclidean distance can be specified using SUM OVER DIFF(2), Manhattan distance can be specified using SUM OVER DIFF(1), Mean Absolute Deviation can be specified as AVG OVER DIFF(1), and Mean Square Deviation can be specified as AVG OVER DIFF(2).

To facilitate the comparison of two trendsets, the definition of comparability may extended by the following observation over trendsets:

Observation 1 [Comparability between two trendsets]. Given two trendsets $T_1$ and $T_2$, a trend $(c_i)(g_1, m_i)$ in $T_1$ is compared with only those trends $(c_j)(g_j, m_j)$ in $T_2$ where $g_i=g_j$ and $m_i=m_j$.

Thus, given two trendsets, it can automatically be inferred which trends between the two trendsets need to be compared. As noted above, the syntax $T_1<->T_2$ is used to denote the comparison between two trendsets $T_1$ and $T_2$. For example, the comparison in example 1a can be represented as [region='Inspiron'][(week, AVG(revenue))]<->[region='Asia', product] [(week, AVG (revenue))].

If both trendsets $T_1$ and $T_2$ consist of the same set of grouping and measure expressions say $\{(g_1, m_1), (g_2, m_2)..., (g_n, m_n)\}$ and differ only in constraint, $T_1<->T_2$ can be succinctly represented as follows:

$[c_1] [(g_1, m_1), (g_2, m_2), ..., (g_n, m_n)]<->[c_2] [(g_1, m_1), (g_2, m_2), ..., (g_n, m_n)] \Rightarrow [c_1<->c_2] [(g_1, m_1), (g_2, m_2)..., (g_n, m_n)]$.

Thus, the comparison between trendsets in example 1a can be succinctly expressed as: [(region='Asia')<->(region='Asia', product)] [(week, AVG(revenue))].

Similarly, the following expression represents the comparison in example 1b: [(region='Asia')<->(region='Asia', product='Inspiron')] [(week, AVG(revenue)), (country, AVG(profit)), ..., (month, AVG(revenue))].

A comparative expression is used to compare two trendsets. A comparative expression is defined as follows:

Definition 9 [Comparative expression]. Given two trendsets $T_1$ and $T_2$, a relation R, and a scorer $\mathcal{F}$, a comparison of $T_1<->T_2$ over relation R computes the scores between trends $(c_i)(g_1, m_i)$ in $T_1$ and $(c_i)(g_1, m_i)$ in $T_2$ where $g_i=g_j$ and $m_i=m_j$.

Based on the above definitions, a new operator, COMPARE, is introduced that makes it easier for data analysts and application developers to express comparative queries.

COMPARE, denoted by $\Phi$, is a logical operator that takes as input a comparative expression specifying two trendsets $T_1<->T_2$ over relation R along with a scorer $\mathcal{F}$ and returns a relation R' which can be represented as follows:

$$\Phi(R, T_1<->T_2, \mathcal{F}) \rightarrow R'.$$

R' consists of scores for each pair of compared trends between the two trendsets. For instance, the table below depicts the output schema (with an example tuple) for the COMPARE expression $[c_1<->c_2] [(g_1, m_1), (g_2, m_2)]$. The values in the tuple indicate that the trend $(c_1=a_1)(g_1, m_1)$ is compared with the trend $(c_2=a_2)(g_1, m_1)$ and the score is 10.

| $c_1$ | $c_2$ | $g_1$ | $m_1$ | $g_2$ | $m_2$ | score |
|---|---|---|---|---|---|---|
| $a_1$ | $a_2$ | True | True | False | False | 10 |
| ... | ... | ... | ... | ... | ... | ... |

The COMPARE operator is expressed in SQL using two extensions, COMPARE and USING, as shown below.

```
COMPARE T_1 <-> T_2
USING F
```

Take example 1a for instance, the comparison between the AVG(revenue) over week trends for the region 'Asia' and each of the products in region 'Asia' can be succinctly expressed as follows:

Listing 1: COMPREXPR1A

```
SELECT R1, P, W, V, score
FROM sales R
  COMPARE [((R.region = Asia) AS R1) < -> (R1, R.product AS P)]
  [R. week AS W, AVG (R.revenue) AS V]
USING SUM OVER DIFF(2) AS score
```

Here $T_1$=[((R.region=Asia) AS R1)][R.week AS W, AVG (R.revenue) AS V] and $T_2$=[((R.region=Asia) AS R1, R.product AS P)][R.week AS W, AVG (R.revenue) AS V]. Observe that $T_1$ and $T_2$ share the same set of (grouping, measure) combinations and the filter predicate (R.region=Asia) in their constraints, thus it is concisely expressed as [((R.region=Asia) AS R1)<->(R1, R.product AS P)][R.week AS W, AVG (R.revenue) AS V]. Table 1 below illustrates the output of this query. The first two columns R1 and P identify the values of constraint for compared trends in $T_1$ and $T_2$. The columns W and V are Boolean valued denoting whether R.week and AVG(R.revenue) were used for the compared trends. Thus, the values of (R1, P, W, V) together identify the pairs of trends that are compared. Since R.week and AVG(R.revenue) are the grouping and measure values for all trends in this example, their values are always True. Finally, the column score specifies the scores computed using Euclidean distance, expressed as SUM OVER DIFF(2).

TABLE 1

Output of COMPARE in Example 1a

| R1 | P | W | V | score |
|---|---|---|---|---|
| Asia | XPS | True | True | 30 |
| Asia | Inspiron | True | True | 24 |
| ... | ... | ... | ... | ... |
| Asia | G8 | True | True | 45 |

Now, consider below the query for example 1b that compares tuples where (R.region=Asia) with tuples where (R.region=Asia) and (R.product ='Inspiron') over a set of (grouping, measure) combinations. This query can be succinctly expressed as follows:

---
Listing 2: COMPAREXPR1B
---
SELECT R1, P, W, C, V, ..., M, score
FROM sales R
COMPARE [((R.region = Asia) AS R1) <-> (R1, (R.product = 'Inspiron') AS P)][(R.week AS W, AVG(R.revenue) AS V), (R.country AS C, AVG(R.profit) AS O), ..., (R.month AS M, V)]
USING SUM OVER DIFF(2) AS score

---

Table 2 below depicts the output for this query. The columns R1 and P are always set to "Asia" and "Inspiron" since the constraint for all trends in T1 and T2 are fixed. W, C, M, V, and P consist of Boolean values telling which columns among R.week, R.country, R.month, AVG(R.revenue), and AVG(R.profit) were used as (grouping, measure) for the pair of compared trends.

TABLE 2

Output of COMPARE in Example 1b

| R1 | P | W | C | M | V | O | Score |
|---|---|---|---|---|---|---|---|
| Asia | Inspiron | True | True | False | True | False | 40 |
| Asia | Inspiron | False | True | False | True | False | 20 |
| ... | ... | ... | ... | ... | ... | ... | ... |
| Asia | Inspiron | False | False | True | True | False | 10 |

From above examples, it is easy to see that queries can be written with using the COMPARE expression for example 2a and example 2b as follows:

---
Listing 3: COMPAREXPR2A
---
SELECT R1, C1, R2, C2, W, V, score
FROM sales R
COMPARE [((R.Region = Asia) AS R1, (R.city) AS C1) <-> ((R.Region = Europe) AS R2, (R.city) AS C2)][R.week AS W, AVG(R.revenue) AS V]
USING SUM OVER DIFF(2) AS score

---

---
Listing 4: COMPAREXPR2B
---
SELECT R1, C1, R2, C2, W, C, V, ..., M, score
FROM sales R
COMPARE [((R.Region = Asia) AS R1, (R.city) AS C1) <-> ((R.Region = Europe) AS R2, (R.city) AS C2)] [(R.week AS W, AVG(R.revenue) AS V), (R.country AS C, AVG(R.profit) AS O), ..., (R.month AS M, V)]
USING SUM OVER DIFF(2) AS score

---

Note that COMPARE is semantically equivalent to a standard relational expression consisting of multiple sub-queries involving union, group-by, and join operators as illustrated in introduction. As such, COMPARE does not add to the expressiveness of relational algebra SQL language. The purpose of COMPARE is to provide a succinct and more intuitive mechanism to express a large class of frequently used comparative queries as shown above. For example, expressing the query in Listing 2 using existing SQL clauses (e.g., see FIG. 1) is much more verbose, requiring a complex sub-query for each (grouping, measure) combination.

Furthermore, the input to COMPARE is a relation, which can either be a base table or an output from another logical operator (e.g., join over multiple tables). Similarly, the output relation from COMPARE can be an input to another logical operator or the final output. Thus, COMPARE can interoperate with other operators. In order to illustrate this, the discussion below describes how COMPARE interoperates with other operators such as join, filter to select top-k trends.

While COMPARE outputs the scores for each pair of compared trends, comparative queries often involve selection of top-k trends based on their scores. Methods for using the above-listed COMPARE sub-expressions (referred by COMPAREXPR1A, COMPAREXPR1B, COMPAREXPR2A, and COMPAREXPR1B) with LIMIT and join to select tuples for trends belonging to top-k will now be discussed.

For example 1a, the following query selects the tuples of a product in region 'Asia' that has the most different AVG(revenue) over week trends compared to that of region 'Asia' overall. COMPAREXPR1A refers to the sub-expression in Listing 1 above.

---
SELECT T.product, T.week, T.revenue, S.score
FROM sales T JOIN
SELECT * FROM COMPAREXPR1A
ORDER BY score DESC
LIMIT 1) AS S
WHERE T.product = S.P

---

The ORDER BY and LIMIT clauses select the top-1 row in Table 1 with the highest score with P consisting of the most similar product. Next, a join is performed with the base table to select all tuples of the most similar product along with its score.

The query for example 2a is shown below. The query for example 2a differs from example 1a in that both trendsets consist of multiple trends. Here, one may be interested in selecting tuples of both cities that are similar. Thus, the WHERE condition is used with (T.city=S.C1 AND T.Region=S.R1) OR (T.city=S.C2 AND T.Region=S.R2). The (S.R1, S.R2, S.C1, S.C2) in the SELECT clause identifies the pair of compared trends.

---
SELECT T.Region, T.city, T.week, T.revenue, S.R1, S.C1, S.R2, S.C2, S.score
FROM sales T JOIN
(SELECT * FROM COMPAREXPR2A
ORDER BY score -continued

```
LIMIT 1) AS S
WHERE (T.city = S.C1 AND T.Region = S.R1) OR (T.city = S.C2 AND
T.Region = S.R2)
```

Examples 1b and 2b extend the examples 1a and 2a, respectively, to multiple attributes. The query for example 2b is shown below. It is a complex version of the query for example 1b (not shown) where trends in each trendsets are created by varying all three of the constraint, grouping, and measure (example 1b has a fixed constraint for each trendset).

```
SELECT T.city, S.R1, S.R2, S.C1, S.C2,
CASE WHEN S.W THEN T. week ELSE NULL END,
...
CASE WHEN S.V THEN T.revenue ELSE NULL END,
S.score
FROM sales T JOIN
(SELECT * FROM COMPAREXPR2B
ORDER BY score
LIMIT 1) AS S
WHERE (T.city = S.C1 AND T.Region = S.R1) OR (T.city = S.C2 AND
T.Region = S.R2)
```

The SELECT clause above only outputs the values of columns for which corresponding trends has the highest score, setting NULL for other columns to indicate that those columns were not part of top-1 pair of trends. An alternative is to output values of all columns, and add (S.W, S.M, S.C, S.P, S.V) (as in the previous example) to the output to indicate which columns were part of the comparison between top-1 pair of trends.

Methods for optimizing a logical query plan consisting of a COMPARE operation will now be discussed. To start, the query optimizer of the DBMS, such as the Microsoft® SQL SERVER optimizer, is extended to replace COMPARE with a sub-plan of existing physical operators using two steps. First, COMPARE is transformed into a sub-plan of existing logical operators. These logical operators are then transformed into physical operators using existing rules to compute the cost of COMPARE. The cost of the sub-plan for COMPARE is combined with costs of other physical operators to estimate the total cost of the query.

The problem of optimizing a query plan consisting of COMPARE operation is defined as follows:

Given a logical query plan consisting of COMPARE operation: $\Phi(R, [c_1 <\!\!-\!\!> c_2] [(d_1, m_1), (d_2, m_2), \ldots (d_n, m_n)], \mathcal{F}) \rightarrow R'$, replace COMPARE with a sub-plan of physical operators with the lowest cost.

For ease of exposition, it is assumed that both trendsets contain the same set of trends, one for each unique value of c, i.e., $c_1 = c_2 = c$.

Starting with the basic plan, COMPARE is transformed into a sub-plan of logical operators. The sub-plan is similar to the one generated by database engines when comparative queries are expressed using existing SQL clauses. The transformation is performed using the following steps:

(1) $\forall (d_i, m_i): R' \leftarrow \text{Group-by}_{c,d_i} \text{Agg}_{m_i}(R)$ (2) $\forall R_i: R_{ij} \leftarrow \bowtie_{R_i.c!=R_j.c, R_i.d_i=R_j.d_i}(R_i)$ (3) $\forall R_{ij}: R_{ijk} \leftarrow \text{Group-by}_{c^i,c^j} \text{Agg}_{UDA_{\mathcal{F}}}(R_{ij}) // c^i, c^j$ are aliases of column c (4) $R' \leftarrow \text{Union}_{i,j,k} \text{All}(R_{ijk})$ First, trendsets for each (grouping, measure) combination were created (e.g., GROUP-BY product, week, AGG on AVG(revenue)). Next, tuples are joined between each pair of trends that are compared, i.e., tuples with different constraints but same value of grouping (e.g., $\bowtie_{R'.product!=R'.product, R'.week=R'.week}$). The score between each pair of trends is computed by applying $\mathcal{F}$ specified as a user defined aggregate (UDA). This is done by first partitioning the join output to create a partition for each pair of trends. Each partition is then aggregated using $\mathcal{F}$. Finally, the scores from comparing the trend pairs are aggregated via Union All.

Figure 4A:
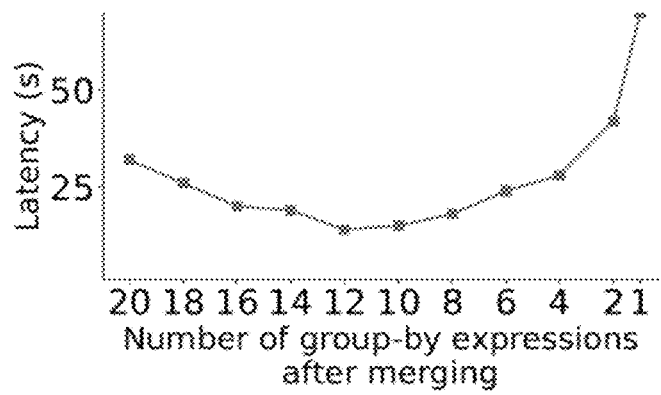
FIG. 4A depicts a graph showing variation in performance as group-by aggregates are merged.

This approach has two issues that may make it less efficient as the size of the input dataset and the number of (grouping, measure) combinations become large. First, aggregations across (grouping, measure) are performed separately, even when there are overlaps in the subset of tuples being aggregated. Second, the cost of join increases rapidly as the number of trends being compared and the size of each trend increases (see FIG. 4B). The sub-plan generated by the optimizer as discussed above is adapted using two optimizations. The first optimization involves merging group-by aggregates. This optimization enables the optimizer to share the computations across a set of group-by aggregates, one for each (grouping, measure), by merging them into fewer group-by aggregates. The (grouping, measure) combinations often share a common grouping column, e.g., [(day, AVG(revenue), (day, AVG(profit)] or have correlated grouping columns (e.g., [(day, AVG(revenue), (month, AVG(revenue)]) or have high degree of overlapping tuples across trends. For example, a set of 20 group-by aggregates in a Flights dataset (found at https://community.amstat.org/jointscsg-section/dataexpo/dataexpo/2009/the-data.html) which computes AVG(ArrivalDelay), AVG(DepDelay), . . . , AVG(Duration) grouped by day, week, . . . , airport. As depicted in FIG. 4A, by merging them (using an approach discussed shortly) into 12 aggregates, the latency improves by 2 times. However, merging is helpful only up to a certain point, after which the performance degrades due to less sharing and much larger increase in the output size of group-by aggregates.

Finding the optimal merging of group-by aggregates is a NP-Complete problem (i.e., nondeterministic polynomial-time complete problem). In this setting, the impact of merging on the cost of subsequent comparison between trends needs to be considered. Ignoring such cost can lead to sub-optimal plans.

Figure 4B:
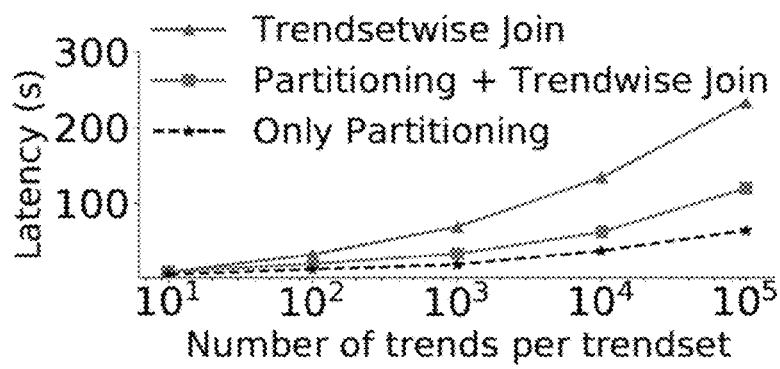
FIG. 4B depicts a graph showing Improvements due to trendwise join after partitioning trendset into trends with the size of each trend being fixed to 1000 tuples.

The second optimization involves enabling trendwise comparisons via partitioning. This is based on the observation that pairwise joins of multiple smaller relations is much faster than a single join between two large relations. This in turn is because the cost of join increases superlinearly with the increase in the size of the trendsets. In addition to improvement in complexity, trendwise joins are more amenable to parallelization than a single join between two trendsets. FIG. 4B depicts the difference in latency for these two approaches as the number of trends is increased from 10 to $10^5$ (each of size 1000). The black dotted line shows the partitioning overhead incurred while creating partitions for each trend which shows that the overhead is small (linear in n) compared to the gains due to trendwise join. Moreover, this is much smaller than the overhead incurred when partitioning is performed on the join output ($\propto n^2$) in the basic plan (see step 3 of the basic plan above).

Figure 5:
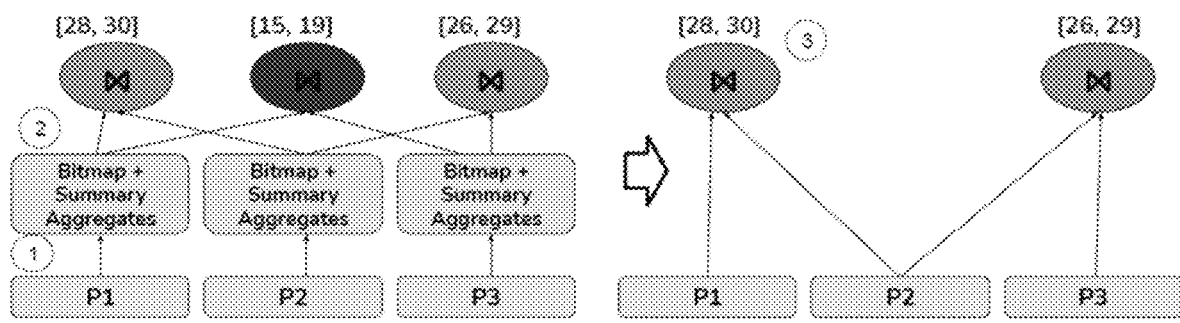
FIG. 5 illustrates pruning for DIFF-based comparison.

FIG. 5 depicts the query plan after applying the above two optimizations on the basic query plan. First, multiple group-by aggregates are merged to share computations (using the approach discussed below). Then, the output of merged group-by aggregates is joined into smaller relations, one for each trend. This is followed by joining and scoring between each pair of trends independently and in parallel. Observe that the merging of group-by aggregates results in multiple trends with overlapping (grouping, measure) in the output relation. Hence, the partitioning is applied in two phases. In the first phase, vertical partitioning is performed, creating one relation for each (grouping, measure). In the second phase, horizontal partitioning is performed, creating one relation for each trend.

Next joint optimization of merging and partitioning is discussed. As depicted in FIG. 4B, the cost of partitioning increases with the increase in the size of its input. The input size is proportional to the number of unique group-by values, which increases with the increase in the number of merging of group-by aggregates. Thus, when the input becomes large, the cost of partitioning dominates the gains due to merging. It is therefore important to merge group-by aggregates such that the overall cost of computing group-by aggregates, partitioning and trendwise comparison together is minimal.

In order to find the optimal merging and partitioning, a greedy approach is followed as outlined in Algorithm 1. The key idea is to merge at the granularity of sub-plans instead of the group-by aggregates. The method starts with a set of sub-plans, one for each (grouping, measure) pair as generated by the basic execution plan discussed above, and two sub-plans are merged at a time that result in the maximum decrease in cost.

as degree of parallelism (DOP). Two sub plans are merged at a time until there is no improvement in cost.

Figure 7:
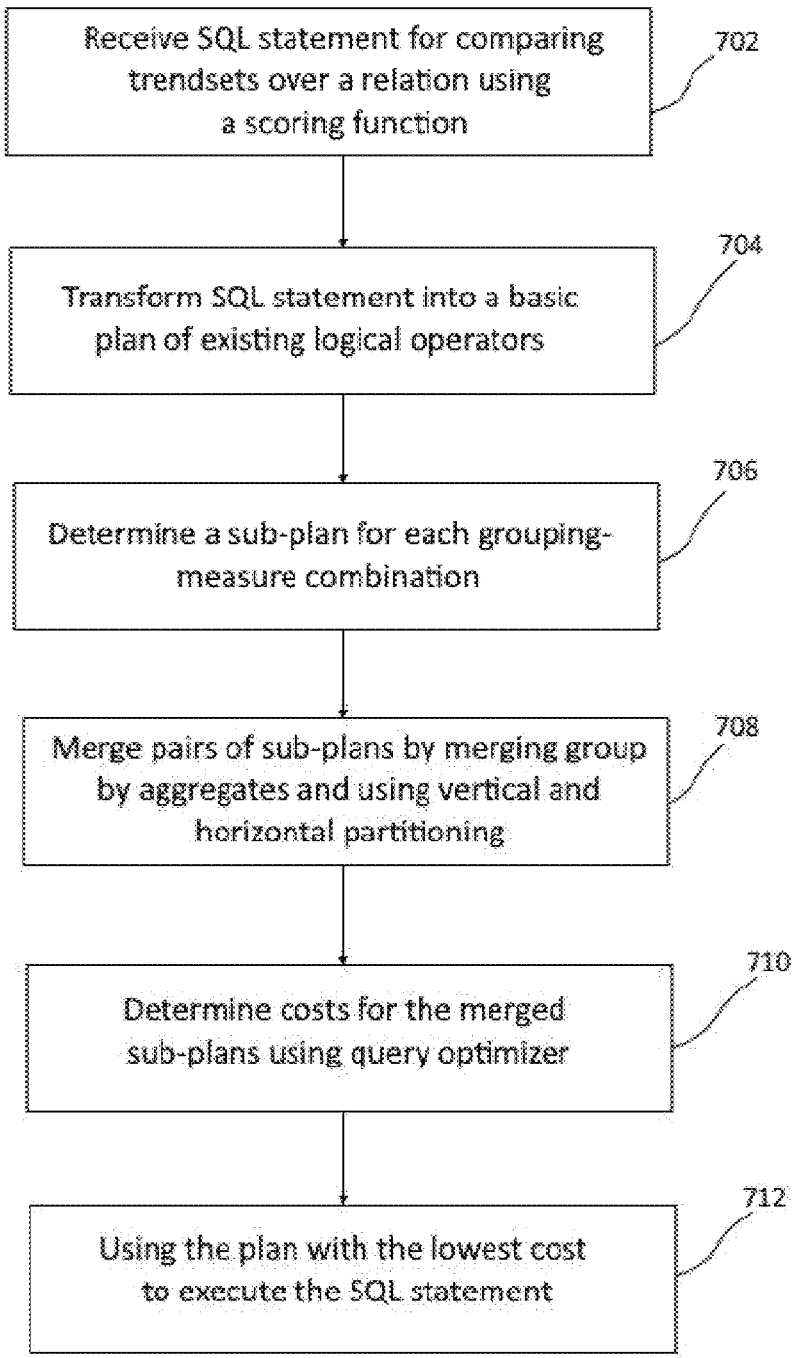
FIG. 7 depicts a flowchart of a method of executing an SQL statement having a COMPARE operator in accordance with this disclosure.

A method of executing an SQL statement based on the COMPARE operator described herein and that includes the optimizations discussed above will now be described with reference to FIG. 7. The method begins receiving an SQL statement for comparing a first trendset to a second trendset over a relation R in a database using a scoring function $\mathcal{F}$. Each of the first and the second trendsets includes one or more trends, and each of the trends is designated by a constraint and a grouping-measure combination (block 702). To compare the trendsets, trend pairs are identified that include a trend from the first trendset and a trend from the second trendset having a common grouping-measure combination (e.g., $(g_1, m_1)$). The SQL statement is transformed into a basic plan of existing logical operators for performing the SQL statement using the query optimizer (block 4). A set of sub-plans is then determined based on the basic plan (706). The set of sub-plans includes one sub-plan for each grouping- measure combination, and each of the sub-plans includes a sequence of group-by aggregate, join and partition operations over one of the respective grouping-measure combinations. Pairs of sub-plans from the set of sub-plans are then merged by merging group by aggregates and using vertical and horizontal partitioning to generate a set of merged sub-plans. A cost for each of the merged sub-plans is determined based on costs of physical operators used to

---

Algorithm 1: Pruning Algorithm for DIFF-based Comparison

---

1:   Let B be a basic sub-plan computed from $\Phi$
2:   while true do
3:      C ← OptimizerCost(B)
4:      Let $s_i \in S$ be a sub-plan in B consisting of a sequence of group-by aggregate, join and partition operations over $(d_i, m_i)$
5:      Let MP = Set of all sub-plans obtained by merging a pair of subplans in S
6:      Let $B_{new}$ be the sub-plan in MP with lowest cost ($C_{new}$) after merging two sub-plans $s_i, s_j$
7:      if $C_{new} > C$ then
8:         break;
9:      end if
10:     C > $C_{new}$
11:     B > $B_{new}$
12:   end while
13:   Return B

---

Formally, if the two sub-plans operate over $(d_1, m_1)$ and $(d_2, m_2)$, respectively, the plans are merges using the following steps (illustrated in FIG. 6):

(1) $R1 \leftarrow \text{Group-By}_{c,d_1,d_2}\text{Agg}_{m_2,m_2}[R]$ // merge group-by aggregates (2) $\forall (d_i, m_i): R_i \leftarrow \Pi_{(d_i,m_i)}(R1)$ // vertical partitioning (3) $\forall i: R_{ij} \leftarrow$ Partion $R_i$ ON c // horizontal partitioning, one partition for each value of c (4) $\forall i, j: R_{ij'} \leftarrow \text{Group-By}_{c_j,d_i}\text{Agg}_{m_i}[R_{ij}]$ // aggregate join (5) $\forall i', j', k: R_{i'j'k} \leftarrow R_{i'j'} \bowtie_{d_i} R_{i'k}$ // partition-wise join (6) $\forall i', j', k: R'_{i'j'k} \leftarrow \text{Agg}_{\text{UDA}_\mathcal{F}}(R_{i'j'k})$ // compute scores (7) $R' \leftarrow \text{Union}_{i'j'k} \text{All}(R'_{i'j'k})$ As can be seen above, the group-by aggregates are merged first to share the computations (step 1), followed by creating partitions for each trend using both vertical and horizontal partitioning (steps 2 and 3). Then, pairs of trends are joined (steps 4 and 5) and the score is computed as discussed above (steps 6 and 7). For computing the cost of the merged sub-plan, the optimizer cost model is used. The cost is computed as a function of available database statistics (e.g., histograms, distinct value estimates), which also captures the effects of the physical design, e.g., indexes as well perform each of the merged sub-plans, e.g., using the query optimizer. The merged sub-plan may then be used to execute the SQL statement.

While the approach discussed above works for any arbitrary scorer (implemented as UDA), note that for top-k comparative queries involving aggregated distance functions (defined above) such as Euclidean distance, the cost of comparison between pairs of trends may still be reduced. The three properties of the DIFF(.) function that may be leveraged for optimizations are discussed next. These three properties are as follows:

1. Non-negativity: $\text{DIFF}(m_1, m_2, p) \geq 0$.
2. Monotonicity: $\text{DIFF}(m_1, m_2, p)$ varies monotonically with the increase or decrease in $|m_1 - m_2|$.
3. Convexity: $\text{DIFF}(m_1, m_2, p)$ are convex for all p.

The following three steps may be used to minimize the number of trends that are compared:

1. Each trend is summarized independently using a set of three aggregates: SUM, MIN and MAX and a bitmap corresponding to the grouping column.
2. Next, the bitmaps between trends are intersected to compute the COUNT of matching tuples between trends, which together with three aggregates help compute the upper and lower bounds on the score between the two trends. Given bounds on scores for each pair of trends, a pruning threshold T may be found on the lowest possible top k score, as the kth largest lower bound score. Any trend pair with its upper bound score smaller than the threshold T can then be pruned.

3. Finally, join is performed only between those trends that are not pruned.

While the pruning incurs an overhead of first computing the summary aggregates and bitmap for each candidate trend, the gains from skipping tuple comparisons for pruned trends offsets the overhead. Moreover, the summary aggregates of each trend can be computed independently in parallel.

FIG. 8A shows the exact scores on comparing two trends. To compute the upper and lower bounds, the simplest approach is to create a single set of summary aggregates for each trend, as depicted in FIG. 8B. The upper and lower row blocks depict the summary aggregates for two trends, respectively, consisting of COUNT (computed using bitmaps), SUM, MIN, and MAX in order. To derive the lower bound, the following property based on the convexity property of DIFF functions was used:

$$\forall \; \text{DIFF}(m_1, m_2, p), \text{AVG (DIFF}(m_1, m_2, p)) \geq \text{DIFF} (\text{AVG}(m_1), \text{AVG}(m_2)) p)$$

This allows DIFF to be applied on the average values of each trend to get a sufficiently tight lower bounds on scores. For example, a lower bound of 1700 (FIG. 8B) is determined for a score of 1717 (FIG. 8A) for the two trends.

For the upper bound, it can be seen that the maximum value of $\text{DIFF}(m_1, m_2, 2)$ between any pairs of tuples in R and S is given by: $(\text{MAX}(|\text{MAX}(m_1)-\text{MIN}(m_2)|, |\text{MAX}(m_2)-\text{MIN}(m_1)|)$. Given that $\text{DIFF}(m_1, m_2, 2)$ is Non-negative and Monotonic, the upper bound on SUM can be computed by multiplying the $\text{MAX}(\text{DIFF}(m_1, m_2, 2))$ by COUNT. For example, the upper bound in FIG. 8B is found to be 6400.

Multiple piecewise summaries may be used in determining the upper bound. Given that the value of measure can vary over a wide range in each trend, using a single summary aggregate often does not result in tight upper bound. Thus, to tighten the upper bound, multiple summary aggregates are created for each trend, by logically dividing each trend into a sequence of l segments, where segment i represents tuples from index:

$$(i-1) \times \frac{n}{l} + 1 \text{ to } i \times \frac{n}{l}$$

where n is the number of tuples in the trend. Instead of creating a single summary, a set of same summary aggregates are computed over each segment, called segment aggregates. For example, FIG. 8C depicts two segment aggregates for each trend, with each segment representing a range of 8 tuples. The bounds between a pair of matching segments are computed in the same way as described above for a single summary of aggregates. Then, the bounds are summed across all pairs of matching segments to get the overall bound. To estimate the number of summary aggregates for each trend, Sturges formula, i.e., $(\lfloor 1+\log_2(n) \rfloor)$, is used, which assumes the normal distribution of measure values for each trend. Because of its low computation overhead and effectiveness in capturing the distribution or trends of values, Sturges formula is widely used in the statistical packages for automatically segmenting or binning data points into fewer groups.

When selecting top-k trends, the computation can be further reduced by ordering the comparison of trends that are not pruned in the previous step. To do so, a utility is assigned to each of the trends that tells how likely they are going to be in the top-k. For estimating the utility of trends, the bounds computed using segment aggregates are used. Specifically, for selecting top-k trends in descending order of their scores, a trend with higher upper bound score has a higher utility, and, for selecting an ascending order of scores, a trend with the smallest lower bound has a higher utility. The processing of higher utility trends leads to the faster improvement in the pruning threshold, thereby minimizing wastage of tuple comparisons over low utility trends.

Furthermore, the utility of a trend can vary after comparing a few tuples in a candidate trend. Hence, instead of processing the entire trend in one go, one segment of a trend may be processed at a time, and then the bounds are updated to check (i) if the trend can be pruned, or (ii) if there is another trend with better utility that can be switched to. Incrementally comparing high utility trends leads to pruning of many trends without processing all of their tuples.

In summary, a new physical operator, $\Phi_p$, has been introduced that takes as input the trends, and replaces the join and scorer $\mathcal{F}$ in the query plan as discussed above. It outputs a relation consisting of tuples that identify the top-k pairs of trends along with their scores. The algorithm used by the operator makes use of four data structures: (1) SegAgg: an array where index i stores summary aggregates for segment i. There is one SegAgg per trend. (2) TState which consists of the current upper and lowers bounds on the score between two trends, as well as the next segment within the trends to be compared next. There is one TState for each trend pair, and it is updated after comparing each pair of segments. (3) $PQ_P$: a max priority queue that keeps track of the trend pairs with the highest upper bound. It is updated after comparing each segment. (4) $PQ_S$: a min priority queue that keeps track of the trend pairs with the smallest lowest bound. It is updated after comparing each segment.

Algorithm 2 shown below depicts the pseudo-code for a single threaded implementation. First, the segment aggregates are computed for trends (line 1). For each pair of trends, the bounds on scores are computed as discussed, and $PQ_S$ is updated to keep track of top k lower bounds (lines 2-5). The upper bound for each trend pair is compared with $PQ_S$.Top( ) to check if it can be pruned (line 7). If not pruned, the TState is initialized and pushed to $PQ_P$ (line 8). Once the TState of all unpruned trends are pushed to PQP, the pair of trends with the highest upper bound score are fetched (line 11). Following the process outlined above, a pair of segments are compared (line 12). After the comparison, a check is made to determine if the current pair of trends is pruned or if there is another pair of trends with a higher upper bound (line 14-15). This process is continued until k pairs of trends are left. Finally, the values of the k pairs of trends with highest scores are output (line 17).

Algorithm 2 Pruning Algorithm for DIFF-based Comparison

1:    Compute SegAgg and bitmaps for each trend ci
2:    for each pair of trends $(c_i, c_j)$ do
3:       Compute bounds on scores
4:       Update $PQ_S$
5:    end for
6:    for each pair of trends $(c_i, c_j)$ do Algorithm 2 Pruning Algorithm for DIFF-based Comparison

```
 7:      If ((c_i,c_j) upper bound < PQ_S.Top( )) Continue;
 8:      Initialize (c_i,c_j) TState and push to PQ_P
 9:    end for
10:    while size of PQ_P > k do
11:      (c_i,c_j) = PQ_P. Top( )
12:      Compare a segment of c_i with that of c_j
13:      Update bounds and PQ_S
14:      If ((c_i,c_j) upper bound < PQ_S. Top( )) Continue;
15:      Push (c_i,c_j) to PQ_P
16:    end while
17:    Return Top k trend pairs of trends and their scores from PQ_P
```

Regarding the memory overhead, given a relation of n tuples consisting of p trends, $\Phi_p$ creates $p \times \log(n/p) + p^2$ segment aggregates (assuming tuples are uniformly distributed across trends), with each segment aggregate consisting of a fixed set of aggregates. In addition, the operator maintains a TState consisting of bounds on scores between each pair of trends as well as the priority queues to maintain top-k pairs of trends. Thus, the overall memory overhead $O(p \times \log(n/p) + p^2)$.

The query optimizer in Microsoft® SQL SERVER relies on algebraic equivalence rules for enumerating query plans to find the plan with the least cost. When COMPARE occurs with other logical operators, five transformation rules that reorder Q with other operators may be utilized to generate more efficient plans. These transformation rules are discussed below.

R1. Pushing $Q$ below join. Data warehouses often have a snowflake or star schema, where the input to COMPARE operation may involve a PK-FK join between fact and dimension tables. If one or more columns in $\Phi$ are the PK columns or have functional dependencies on the PK columns in the dimension tables, $\Phi$ can be pushed down below the join on the fact table by replacing the dimension table columns with the corresponding FK columns in the fact table. For instance, consider example 1a from above that finds a product with a similar average revenue over week trend to 'Asia'. Here, the 'revenue' column would typically be in a fact table along with foreign key columns for region, product and year. In such cases, $\Phi$ can be pushed below the join by replacing the dimension table columns (e.g., product, week) values with corresponding PK column values.

R2. Pushing Group-by Aggregate ($\Upsilon$) below $\Phi$ to remove duplicates. When an aggregate operation occurs above a COMPARE operation, in some cases the aggregate operation can be pushed below the COMPARE to reduce the size of each partition. In particular, consider an aggregate operation $\Upsilon_{G,A}$ with group by attributes G and aggregate function A such that all columns used in $\Phi$ are in G. Then, if all aggregation functions in $\Phi \in \{MAX, MIN\}$, $\Upsilon$ can be pushed below $\Phi$. Pushing aggregation operations below $\Phi$ reduces the size of each partition by removing the duplicate values.

R3. Predicate pushdown. A filter operation ($\sigma$) on a partition column (e.g., product) can be pushed down below $\Phi$, to reduce the number of partitions to be compared. While predicate pushdown is standard in optimization, optimizers may not be able to apply such optimizations when the COMPARE operations are expressed via complex combinations of operations as described above. Adding an explicit logical COMPARE, with a predicate pushdown rule makes it easier for the optimizer to apply this optimization. Note that if a involves any attribute other than the partitioning column, then it cannot be pushed below $\Phi$. This is because the number of tuples for partitions compared in $\Phi$ can vary depending on its location.

R4. Commutativity. A single query can consist of a chain of multiple COMPARE operations for performing comparison based on different metrics (e.g., comparing products first on revenue, and then on profit). When multiple $\Phi$ operations are on the same partitioning attribute, the order can be swapped such that more selective COMPARE operation is executed first.

R5. Reducing comparative sub plans to $\Phi$. Finally, the optimizer may be extended to check for an occurrence of the comparative subexpression specified using existing relational operators to create an alternative candidate plan by replacing the sub-expression with $\Phi$. In order to do so, the equivalence rule R5 is where the expression on the left side represents the sub-expression using existing relational operators. This rule enables the physical optimizations for comparative queries expressed without using SQL extensions to be leveraged.

The optimizations proposed above deal with replacing COMPARE with a sub-plan of logical and physical operators within existing database engines. These optimizations can be incorporated in other database engines supporting cost-based optimizations and addition of new transformation rules. Concretely, given a COMPARE expression, one can generate a sub-plan using Algorithm 1 and transformation rules implementing steps outlined above. Furthermore, additional transformation rules were described that optimize the query when COMPARE occurs along with other logical operators such as join, group-by, and filter. In addition, it was shown that DIFF-based comparisons can be further optimized by adding a new physical operator that first computes the upper and lower bounds on the scores of each trend, which can then be used for pruning partitions without performing costly join.

Figure 6:
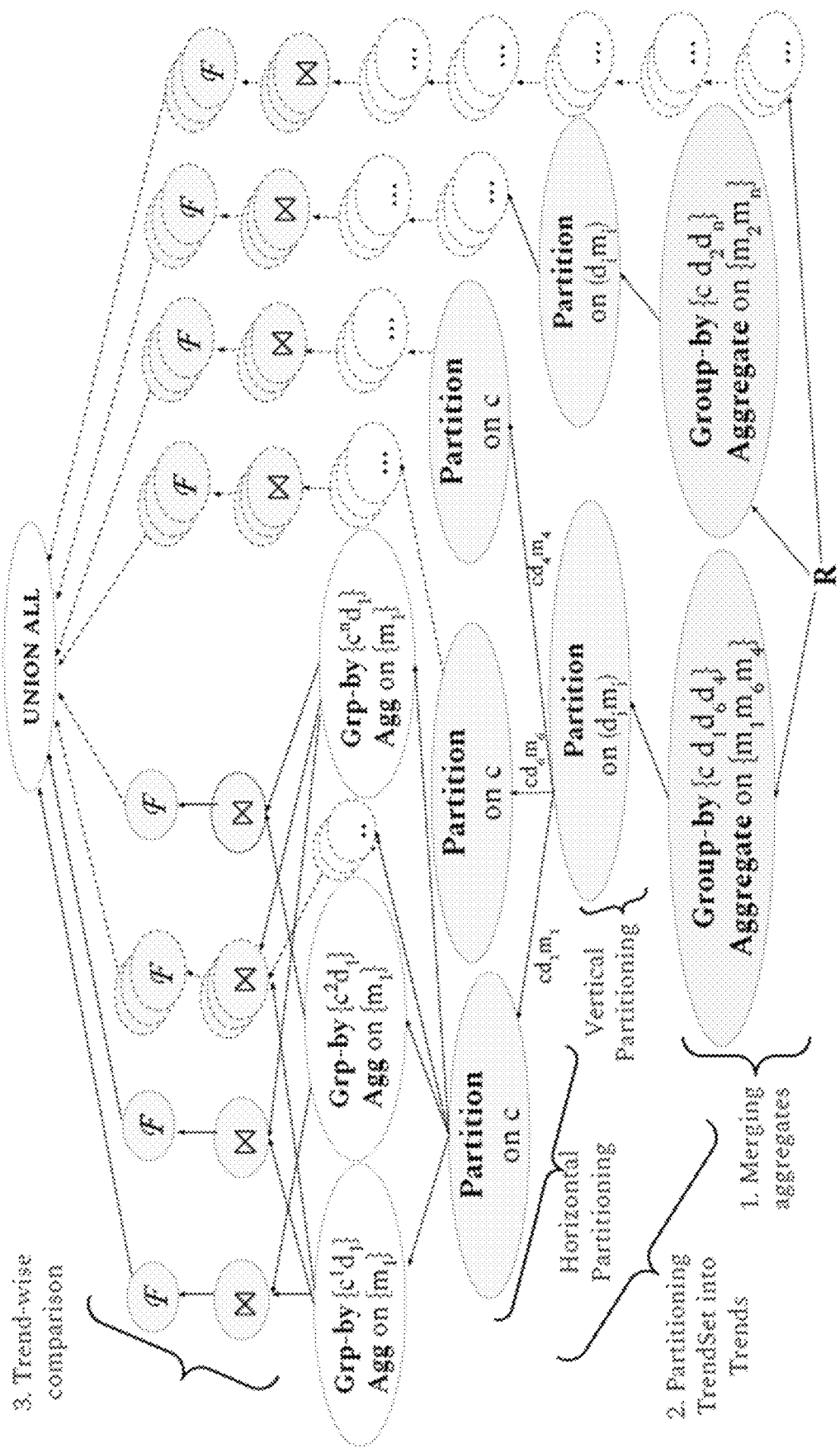
FIG. 6 illustrates the optimized query plan generated after applying merging and partitioning on basic query plan.

A large part of COMPARE execution involves operators such as group-by, joins and partition (See, e.g., FIG. 6). Hence, the effect of physical design changes on COMPARE is similar to their effect on these operators. For instance, since column-stores tend to improve the performance of group-by operations, they will likely improve the performance of COMPARE. Similarly, if indexes are ordered on the columns used in constraints or grouping, the optimizer will pick merge join over hash-join for joining tuples from two trends. Finally, if there is a materialized view for a part of the COMPARE expression, modern day optimizers can match and replace the part of the sub-plan with a scan over the materialized view. The impact of indexes on COMPARE implementation are further discussed below.

COMPARE is intended to be used by data analysts as well as applications to issue comparative queries over large datasets stored in relational databases. It has two advantages over regular SQL and middleware approaches (e.g., Zenvisage, Seedb). First, it allows succinct specification of comparative queries which can be invoked from data analytic tools supporting SQL clients. Second, it helps avoid data movement and serialization and deserialization overheads and is thus more efficient and scalable.

Based on an implementation COMPARE on SQL SERVER, the improvement in latency was evaluated with respect to current execution strategy in SQL SERVER. Two alternative strategies were selected as baselines:

1. MIDDLEWARE: Issuing select-aggregate queries to retrieve the data from SQL SERVER over a network (average speed of 10 MB/s) and performing comparison and filtering in a C# implementation. This approach mimics the data retrieval approach followed by visualization tools such as Zenvisage while also incorporating trendwise comparison and segment-aggregates based pruning optimizations.
2. a UDF implementation that executes within SQL SERVER. It takes as input the UNION of all group-by aggregates (computed via GROUPING SETs clause) and incorporates trendwise comparison and segment-aggregates based pruning optimizations.

Two datasets were used: the Flight dataset and TPC-DS with a scale factor of 100 (summarized in Table 4 shown below). The websales table in TPC-DS was used which has PK-FK joins with tables webpages and warehouses. Four types of comparative queries were issued, with the default number of output pair of trends set to 5. All measure attributes are aggregated using AVG( ) and we use SUM( ) OVER DIFF(2) as scorer.

TABLE 4

Datasets

| Dataset | Disk Size | Buffer Size | Number of rows |
|---------|-----------|-------------|----------------|
| Flight  | 8 GB      | 11 GB       | 74M            |
| TPC-DS  | 20 GB     | 24 GB       | 720M           |

All experiments were conducted on a 64-bit Windows 2012 Server with 2.6 GHz Intel xeon E3-1240 10-core, 20 logical processors and 192 GB of 2597 MHz DDR3 main memory. Unless specified, the default settings were used for the degree of parallelism (DOP) and buffer memory, where the SQL SERVER tries to utilize the maximum possible resources available in the system. The results of warm runs were reported by loading the tables referenced in the query into memory.

Figure 9A:
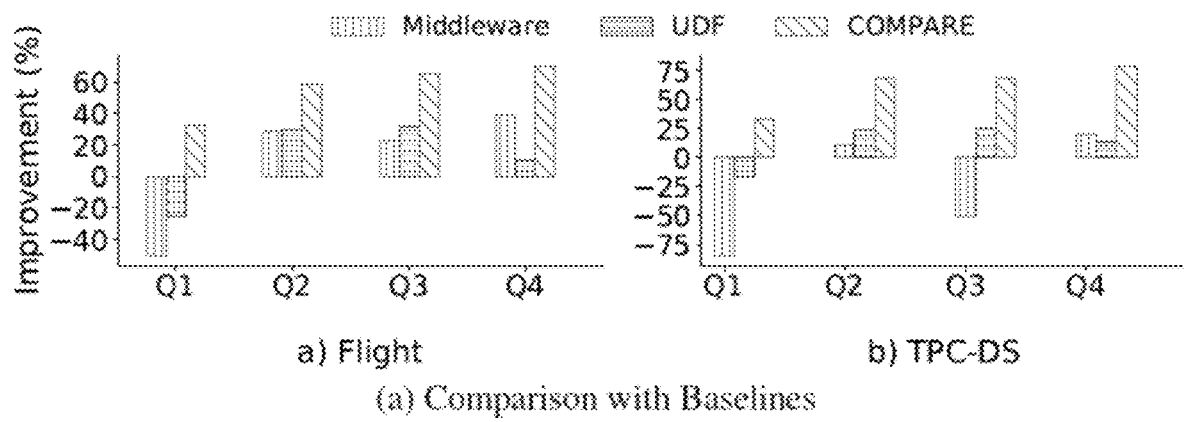
FIG. 9A depicts a graph showing the end-to-end improvement in latency of COMPARE, MIDDLEWARE, and UDF with respect to the unmodified SQL SERVER runtimes.

FIG. 9A depicts the end-to-end improvement in latency of COMPARE, MIDDLEWARE, and UDF with respect to the unmodified SQL SERVER runtimes. It can be seen that COMPARE provides a substantial improvement with respect to all approaches, with improvement being proportional number and size of trends.

For Q1 that involves one to many comparisons over a fixed attribute combination, a speed-up is seen of about 26% on Flight and about 36% on the TPC-DS. The improvement increases substantially as the complexity of the query is increased. For example, up to 4 times improvement in latency for Q2 and Q4 which involves a large number of trend comparisons is seen. For MIDDLEWARE, the main bottleneck is the data transfer and deserialization overhead, which takes up to 70% of the overall execution time. While UDF also incurs an overhead in invocation and reading the input from downstream aggregate operators, a large part of its time e.g., greater than 90%) is spent on processing, indicating that inline execution of COMPARE via partitioning and join operators is much faster. In summary, it was found that COMPARE gives the best of both worlds: requires minimal data transfer and deserialization overhead and runs much faster by efficiently comparing tuples within databases.

Figure 9B:
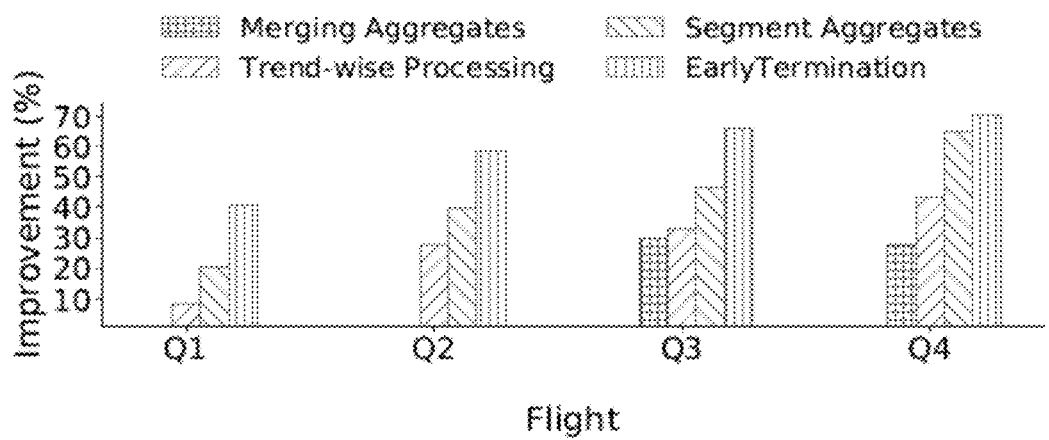
FIG. 9B depicts a graph showing improvement associated with each of the optimizations for use with COMPARE.

Next, an ablative analysis was conducted to evaluate the effectiveness of each of the optimizations described above. FIG. 9B depicts the impact of each optimization as they were added successively from left to right. Each level of COMPARE optimization provides a substantial speed-up in latency compared to basic execution strategy. For Q3 and Q4, sharing aggregates improves the runtime by about 30% (note that there are no sharing opportunities for Q1 and Q2). The trend-wise processing further improves the processing by 25% on average such that the higher the number of trend comparisons, the higher the improvement. Note that both sharing aggregates and trend-wise processing do not depend on the properties of scorer and hence can be applied using an arbitrary scorer. The next two optimizations based on segment-aggregates and early termination, although only applicable for DIFF($m_1$, $m_2$, 2)-based comparisons, result in the massive improvement ranging between 20-25% by pruning trends early that are guaranteed to be not in top-k.

Figure 10A:
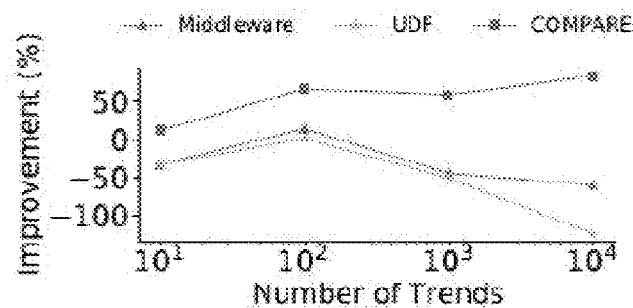
FIG. 10A depicts a graph showing the impact on improvement when varying the number of trends with fixed (grouping, measure).

The impact of dataset characteristics on the performance of COMPARE was also evaluated. For these experiments, the flight dataset was used (consisting of real-world trends/distributions) which was scaled in size. Referring to FIG. 10A, the number of trends for query Q2 between 10 and $10^4$ were scaled by randomly removing or replicating the trends corresponding to original 384 airports. While replicating, the original value $m_o$ of each measure column m was updated by a new value $m_n$ where $m_n = m_o \pm \text{stdev}(m)$. This ensures that the replicated trends are not duplicates but still represent the original distribution. It was found that the increase in the number of trends leads to the increase in latency for all approaches. However, the increase is much higher for UDF and MIDDLEWARE due to data movement and deserialization overhead. COMPARE is further able to reduce comparisons due to early pruning of partitions using segment-aggregates.

Figure 10B:
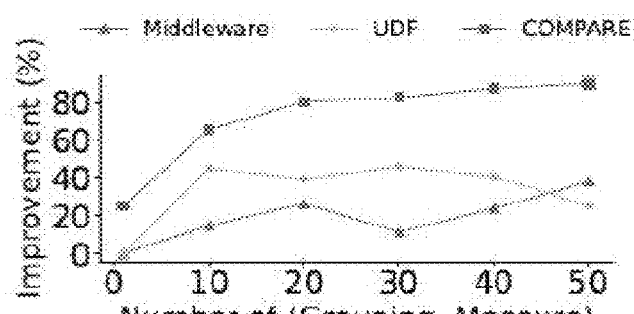
FIG. 10B depicts a graph showing the impact on improvement when varying the number of (grouping, measure) combinations.

The impact of the number of (grouping, measure) pairs was also evaluated as depicted in FIG. 10B. In this case, the number of (grouping, measure) pairs for query Q3 between 1 and 50 were scaled by randomly removing or replicating the columns for each trend while updating the values of replicated measure column as described above. All approaches incur increases in latency. However, the increase in latency is much higher for SQL SERVER compared to COMPARE, MIDDLEWARE and UDF due to higher sharing of aggregate computations.

Figure 10C:
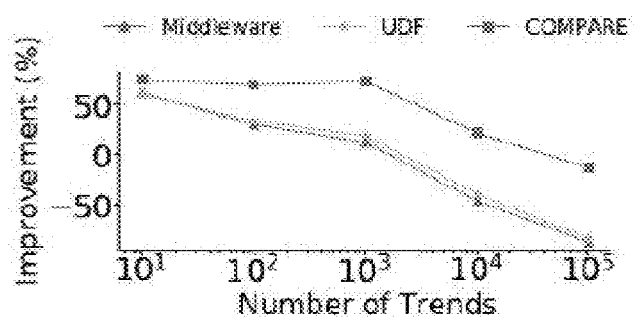
FIG. 10C depicts a graph showing the impact on improvement when increasing number of trends with proportional decrease in trend size over a fixed data of size $10^5$.

In addition, the number and size of trends were varied while keeping the overall data size fixed as depicted in FIG. 10C. Using a similar process as described above, the number of trends between 10 and $10^5$ were scaled while proportionally decreasing the size of each trend such that the size of the dataset is fixed to $10^5$. Here, it was found that the latency of SQL SERVER decreases as the number of trends was decreased and reduced in size. This is because with the decrease in the size of trends, the number of tuple comparison decreases. As a result of this, the improvement in latency w.r.t SQL SERVER decreases for all of COMPARE, MIDDLEWARE, and UDF. However, for COMPARE, the latency initially decreases as sorting and comparison can be done faster in parallel as the number of partitions increase. As the number of partitions become too large, the improvement due to parallelism decreases.

The impact of the number of segment aggregates was also evaluated. As discussed above, the Sturges formula, i.e., ($\lfloor 1+\log_2(n) \rfloor$) (where n is the estimated size of the trend), is used to estimate the number of segment-aggregates. To measure the efficacy of this formula, the changes in latency were measured as the number of segment-aggregates for Q2 (FIG. 11A) and Q4 (FIG. 11B) were increased. With the increase in the number of segments, the overall latency decreased initially. However, as the number of segments is increased beyond a certain number, the latency starts increasing. This is because of the increase in the number of segment-aggregates comparisons that result without further pruning. The dotted lines in FIGS. 11A and 11B show the results based on the number of segments (i.e., $(\lfloor 1+\log_2(n) \rfloor)$) that are automatically selected by COMPARE. As can be seen, the latency for selected segments is close to the minimal possible latency.

Next, the impact of the number of tuples processed per update for early termination was measured. FIGS. 12A and 12B show the impact of overall latency for Q2 and Q4, respectively, as the number of tuples processed for a given trend for updating the upper and lower bounds was varied. The dotted line depicts the performance for the number of tuples automatically chosen by COMPARE, i.e., $$\left( \frac{n}{(\lfloor 1 + \log_2(n) \rfloor)} \right)$$

(i.e., estimated size of a segment). As can be seen, the latency is very high when only a few tuples (<10) are considered at time. This is because of cache misses and many updates to the priority queues for reprocessing the same set of partitions repeatedly. On the other hand, processing too many tuples can lead to extra processing, even for low utility partitions that can be pruned earlier. As depicted by the dotted line, the number of tuples chosen by COMPARE, although not perfect, is close to the optimal performance possible when processing few tuples at a time.

Figure 13A:
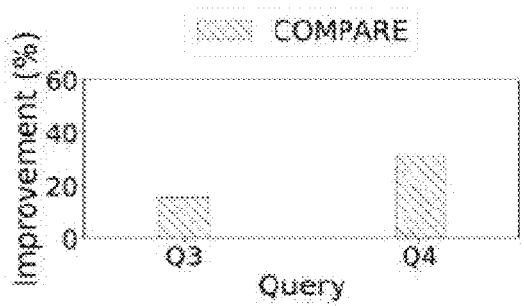
FIGS. 13A and 13B depict graphs showing the improvement due to join pushdown and aggregate pushdown, respectively.
Figure 13B:
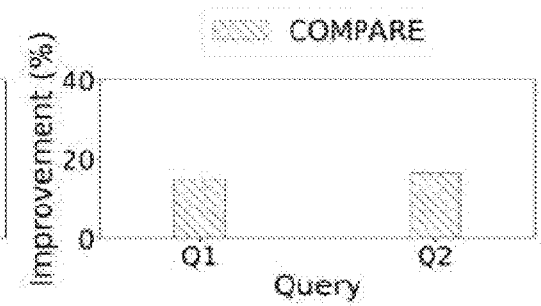

Regarding the impact of transformation rules, FIGS. 13A and 13B depict the performance results on pushing $\Phi$ below PK-FK joins (⋈) and pushing Aggregate ($\Upsilon$) below $\Phi$, respectively. Although not shown in the figures, the results on other logical optimizations such as predicate pushdown and reordering of multiple Q operations indicate that the gains are always proportional to the selectivity of predicates and the $\Phi$ operation pushed down.

To evaluate the transformation of pushing $\Phi$ below ⋈, Q3 and Q4 were considered over websales table of TPC-DS dataset which has PK-FK joins with two other tables. It was observed that by pushing $\Phi$ below join leads to the improvement in the runtime of both queries due to reduction in amount of time taken by join. For Q3, $\Phi$ reduces the size of websales to $\frac{1}{30}^{th}$ of the original size, which improves the overall latency by about 18%. On the other hand, the selectivity of $\Phi$ for Q4 is more, i.e., $\frac{1}{200}^{th}$ of the original size, which leads to a relatively higher improvement of about 32% in latency. Thus, the amount of gain increases with the increase in the selectivity of $\Phi$.

To evaluate the transformation of pushing $\Upsilon$ (aggregation) below $\Phi$, MAX was used as the aggregation function for measure and scorer in Q1 and Q2 over the Flight dataset. A simple aggregation operation $\Upsilon_{G,A}$ was used on top of $\Phi$, setting G equal to {Days, ArrDelays} and A equal to COUNT (*). While $\Upsilon$ needs to process more tuples compared to when it is above $\Phi$, the pushdown helps improve the overall latency by reducing duplicate values of G, which minimizes the overall number of pair comparisons for $\Phi$ above. In particular, it was observed that pushing $\Upsilon$ down reduces the input to $\Phi$ by about 24% leading to an improvement of of about 14% for Q1 and 19% for Q2.

Figure 14:
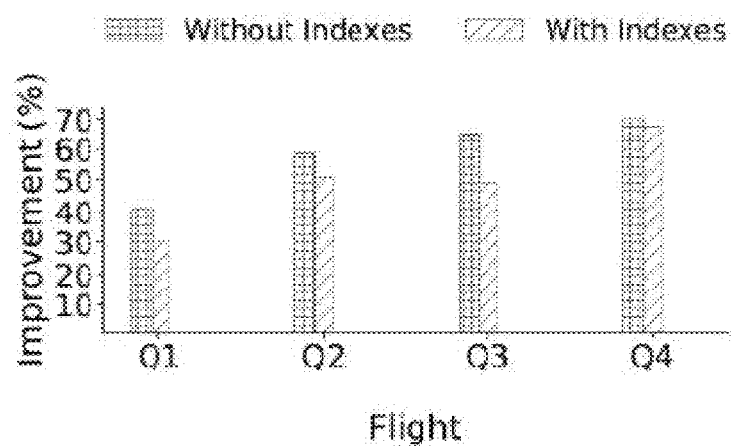
FIG. 14 depicts a graph showing the impact of adding non-clustered indexes on referenced columns and removing other columns.

To evaluate the changes in physical design on COMPARE, the following changes were made on the Flight data set. All columns were removed from the tables that are not part of queries, and created non-clustered indexes on the queried columns. Adding indexes resulted in between 20% to 38% improvement in overall runtime across queries. The major changes in physical plan include the use of index scan and the replacement of hash join with merge join. As depicted in FIG. 14, due to overall decrease in runtime, the performance improvement for COMPARE when indexes are used is less than when indexes are not used. However, compared to regular SQL, COMPARE is still between 2 and 3 times faster. This is primarily because of the reduction in CPU time due to sharing of aggregates, trend-wise processing and pruning of trend comparisons.

Figure 15A:
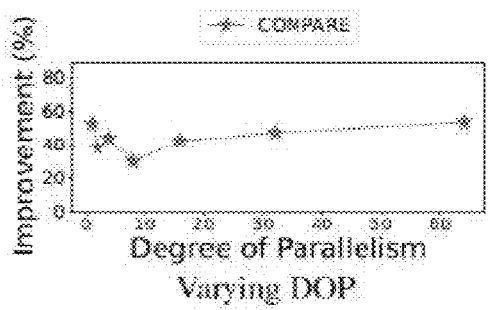
FIGS. 15A and 15B depicts graphs showing the impact of parallelism and memory overload, respectively.

FIG. 15A shows the improvement in latency of COMPARE w.r.t. SQL SERVER on Q1 as the Degree of Parallelism (DOP) was varied from 1 to 64. Both SQL SERVER and COMPARE benefit significantly from increasing DOP up to a point, after which they experience diminishing returns. For any given DOP, COMPARE is usually faster, i.e., between 2 to 3 times faster, similar to what was seen in regard to the transformation rules.

Figure 15B:
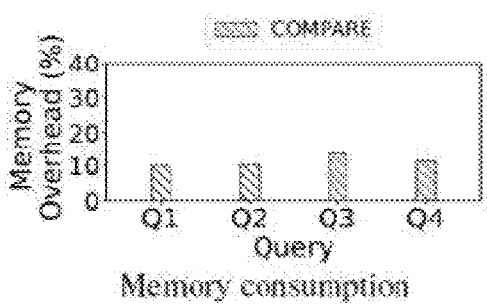

FIG. 15B shows the additional overhead in committed memory usage of COMPARE w.r.t. to SQL SERVER for each of the queries. Although COMPARE uses additional data structures for maintaining segment-aggregates, and bounds in the priority queue, the overhead is minimal (i.e., <13%) compared to the memory already used by the system for sorting and maintaining aggregates which are common to all approaches. Moreover, the execution engine reuses the memory already committed by the downstream operators in the plan, instead of allocating new memory. Thus, the total memory used during query processing is bounded by the maximum memory used by any operator in the plan.

Figure 16:
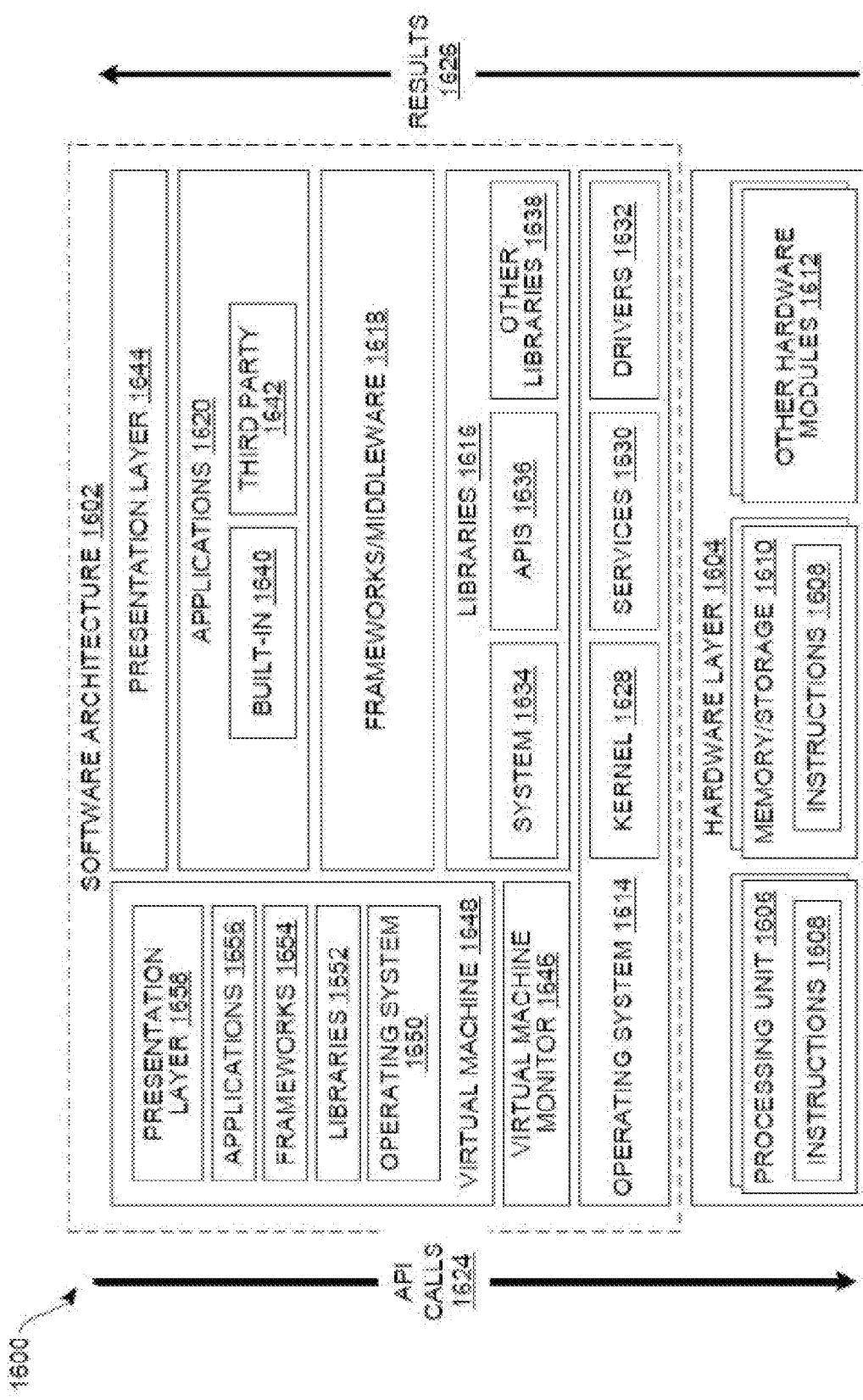
FIG. 16 is a block diagram illustrating an example software architecture, various portions of which may be used in conjunction with various hardware architectures herein described.

FIG. 16 is a block diagram 1600 illustrating an example software architecture 1602, various portions of which may be used in conjunction with various hardware architectures herein described, which may implement any of the above-described features. FIG. 16 is a non-limiting example of a software architecture and it will be appreciated that many other architectures may be implemented to facilitate the functionality described herein. The software architecture 1602 may execute on hardware such as the central processing unit 1402 that may include, among other things, document storage, processors, memory, and input/output (I/O) components. A representative hardware layer 1604 is illustrated and can represent, for example, the devices described herein. The representative hardware layer 1604 includes a processing unit 1606 and associated executable instructions 1608. The executable instructions 1608 represent executable instructions of the software architecture 1602, including implementation of the methods, modules and so forth described herein. The hardware layer 1604 also includes a memory/storage 1610, which also includes the executable instructions 1608 and accompanying data. The hardware layer 1604 may also include other hardware modules 1612. Instructions 1608 held by processing unit 1608 may be portions of instructions 1608 held by the memory/storage 1610.

The example software architecture 1602 may be conceptualized as layers, each providing various functionality. For example, the software architecture 1602 may include layers and components such as an operating system (OS) 1614, libraries 1616, frameworks 1618, applications 1620, and a presentation layer 1644. Operationally, the applications 1620 and/or other components within the layers may invoke API calls 1624 to other layers and receive corresponding results 1626. The layers illustrated are representative in nature and other software architectures may include additional or different layers. For example, some mobile or special purpose operating systems may not provide the frameworks/middleware 1618.

The OS 1614 may manage hardware resources and provide common services. The OS 1614 may include, for example, a kernel 1628, services 1630, and drivers 1632. The kernel 1628 may act as an abstraction layer between the hardware layer 1604 and other software layers. For example, the kernel 1628 may be responsible for memory management, processor management (for example, scheduling), component management, networking, security settings, and so on. The services 1630 may provide other common services for the other software layers. The drivers 1632 may be responsible for controlling or interfacing with the underlying hardware layer 1604. For instance, the drivers 1632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1616 may provide a common infrastructure that may be used by the applications 1620 and/or other components and/or layers. The libraries 1616 typically provide functionality for use by other software modules to perform tasks, rather than rather than interacting directly with the OS 1614. The libraries 1616 may include system libraries 1634 (for example, C standard library) that may provide functions such as memory allocation, string manipulation, file operations. In addition, the libraries 1616 may include API libraries 1636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1616 may also include a wide variety of other libraries 1638 to provide many functions for applications 1620 and other software modules.

The frameworks 1618 (also sometimes referred to as middleware) provide a higher-level common infrastructure that may be used by the applications 1620 and/or other software modules. For example, the frameworks 1618 may provide various graphic user interface (GUI) functions, high-level resource management, or high-level location services. The frameworks 1618 may provide a broad spectrum of other APIs for applications 1620 and/or other software modules.

The applications 1620 include built-in applications 1640 and/or third-party applications 1642. Examples of built-in applications 1640 may include, but are not limited to, a contacts application, a browser application, a location application, a media application, a messaging application, and/or a game application. Third-party applications 1642 may include any applications developed by an entity other than the vendor of the particular platform. The applications 1620 may use functions available via OS 1614, libraries 1616, frameworks 1618, and presentation layer 1644 to create user interfaces to interact with users.

Some software architectures use virtual machines, as illustrated by a virtual machine 1648. The virtual machine 1648 provides an execution environment where applications/modules can execute as if they were executing on a hardware machine. The virtual machine 1648 may be hosted by a host OS (for example, OS 1614) or hypervisor, and may have a virtual machine monitor 1646 which manages operation of the virtual machine 1648 and interoperation with the host operating system. A software architecture, which may be different from software architecture 1602 outside of the virtual machine, executes within the virtual machine 1648 such as an OS 1650, libraries 1652, frameworks 1654, applications 1656, and/or a presentation layer 1658.

Figure 17:
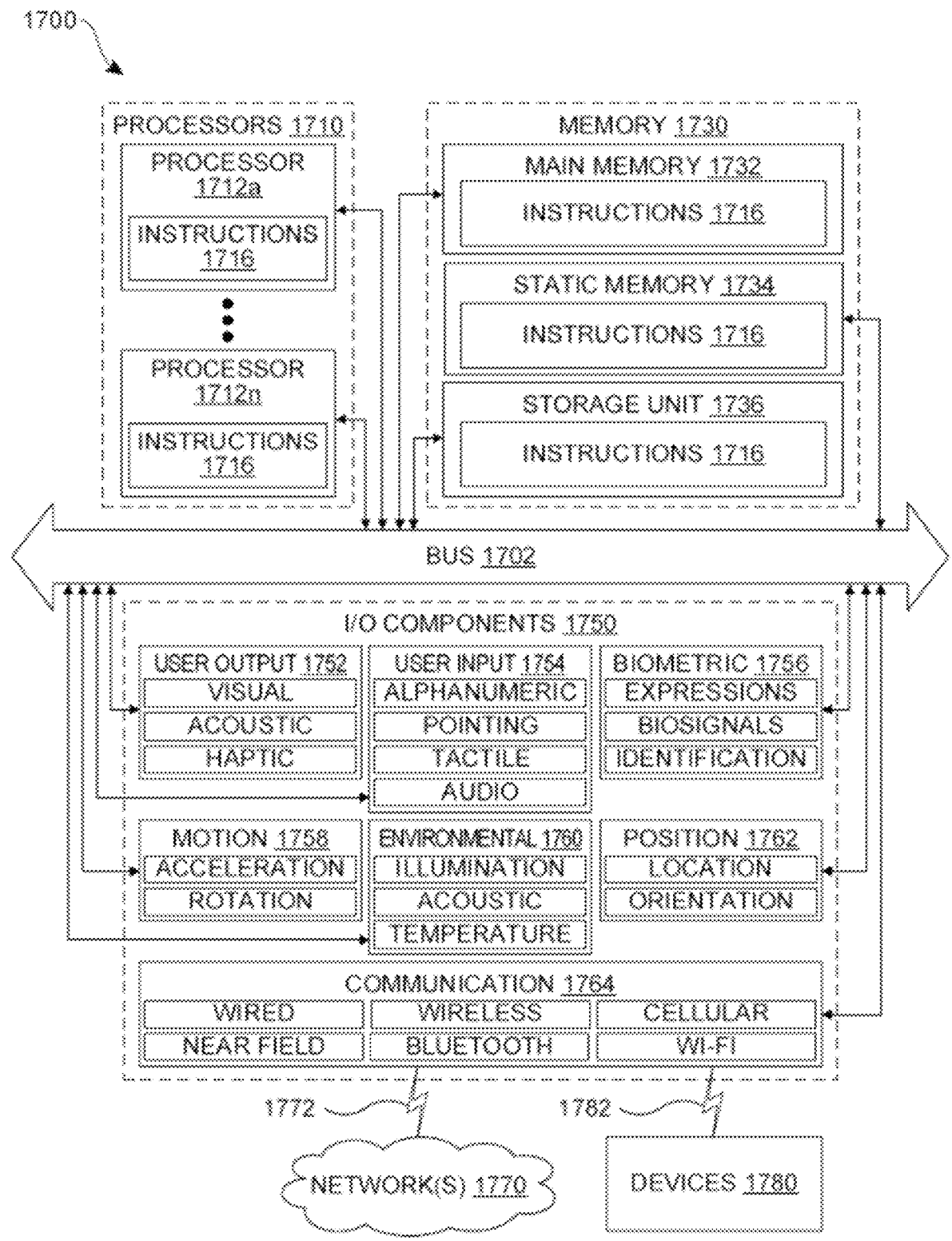
FIG. 17 is a block diagram illustrating components of an example machine configured to read instructions from a machine-readable medium and perform any of the features described herein.

FIG. 17 is a block diagram illustrating components of an example machine 1700 configured to read instructions from a machine-readable medium (for example, a machine-readable storage medium) and perform any of the features described herein. The example machine 1700 is in a form of a computer system, within which instructions 1716 (for example, in the form of software components) for causing the machine 1700 to perform any of the features described herein may be executed. As such, the instructions 1716 may be used to implement modules or components described herein. The instructions 1716 cause unprogrammed and/or unconfigured machine 1700 to operate as a particular machine configured to carry out the described features. The machine 1700 may be configured to operate as a standalone device or may be coupled (for example, networked) to other machines. In a networked deployment, the machine 1700 may operate in the capacity of a server machine or a client machine in a server-client network environment, or as a node in a peer-to-peer or distributed network environment. Machine 1700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1700 is illustrated, the term "machine" includes a collection of machines that individually or jointly execute the instructions 1716.

The machine 1700 may include processors 1710, memory 1730, and I/O components 1750, which may be communicatively coupled via, for example, a bus 1702. The bus 1702 may include multiple buses coupling various elements of machine 1700 via various bus technologies and protocols. In an example, the processors 1710 (including, for example, a central processing unit (CPU), a graphics processing unit (GPU), a digital signal processor (DSP), an ASIC, or a suitable combination thereof) may include one or more processors 1712a to 1712n that may execute the instructions 1716 and process data. In some examples, one or more processors 1710 may execute instructions provided or identified by one or more other processors 1710. The term "processor" includes a multi-core processor including cores that may execute instructions contemporaneously. Although FIG. 17 shows multiple processors, the machine 1700 may include a single processor with a single core, a single processor with multiple cores (for example, a multi-core processor), multiple processors each with a single core, multiple processors each with multiple cores, or any combination thereof In some examples, the machine 1700 may include multiple processors distributed among multiple machines.

The memory/storage 1730 may include a main memory 1732, a static memory 1734, or other memory, and a storage unit 1736, both accessible to the processors 1710 such as via the bus 1702. The storage unit 1736 and memory 1732, 1734 store instructions 1716 embodying any one or more of the functions described herein. The memory/storage 1730 may also store temporary, intermediate, and/or long-term data for processors 1710. The instructions 1716 may also reside, completely or partially, within the memory 1732, 1734, within the storage unit 1736, within at least one of the processors 1710 (for example, within a command buffer or cache memory), within memory at least one of I/O components 1750, or any suitable combination thereof, during execution thereof. Accordingly, the memory 1732, 1734, the storage unit 1736, memory in processors 1710, and memory in I/O components 1750 are examples of machine-readable media.

As used herein, "machine-readable medium" refers to a device able to temporarily or permanently store instructions and data that cause machine 1700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1716) for execution by a machine 1700 such that the instructions, when executed by one or more processors 1710 of the machine 1700, cause the machine 1700 to perform and one or more of the features described herein. Accordingly, a "machine-readable medium" may refer to a single storage device, as well as "cloud-based" storage systems or storage networks that include multiple storage apparatus or devices.

The I/O components 1750 may include a wide variety of hardware components adapted to receive input, provide output, produce output, transmit information, exchange information, capture measurements, and so on. The specific I/O components 1750 included in a particular machine will depend on the type and/or function of the machine. For example, mobile devices such as mobile phones may include a touch input device, whereas a headless server or IoT device may not include such a touch input device. The particular examples of I/O components illustrated in FIG. 17 are in no way limiting, and other types of components may be included in machine 1700. The grouping of I/O components 1750 are merely for simplifying this discussion, and the grouping is in no way limiting. In various examples, the I/O components 1750 may include user output components 1752 and user input components 1754. User output components 1752 may include, for example, display components for displaying information (for example, a liquid crystal display (LCD) or a projector), acoustic components (for example, speakers), haptic components (for example, a vibratory motor or force-feedback device), and/or other signal generators. User input components 1754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1750 may include biometric components 1756, motion components 1758, environmental components 1760, and/or position components 1762, among a wide array of other possible sensor components. The biometric components 1756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The motion components may include, for example, acceleration and/or rotation sensors for various components of the 3D printer. The environmental components may include, for example, light sensors (for example, photodiodes, photoresistors, or phototransistors), acoustic sensors (for example, piezoelectric sensors or acoustic wave sensors), or temperature sensors (for example, thermocouples or thermistors), which may sense environmental conditions for various locations in the 3D printer. The position components 1762 may include, for example, location sensors (for example, a Global Position System (GPS) receiver), altitude sensors (for example, an air pressure sensor from which altitude may be derived), and/or orientation sensors (for example, magnetometers).

The I/O components 1750 may include communication components 1764, implementing a wide variety of technologies operable to couple the machine 1304 to network(s) 1770 and/or device(s) 1780 via respective communicative couplings 1772 and 1782. The communication components 1764 may include one or more network interface components or other suitable devices to interface with the network(s) 1770. The communication components 1764 may include, for example, components adapted to provide wired communication, wireless communication, cellular communication, Near Field Communication (NFC), Bluetooth communication, Wi-Fi, and/or communication via other modalities. The device(s) 1780 may include other machines or various peripheral devices (for example, coupled via USB).

In some examples, the communication components 1764 may detect identifiers or include components adapted to detect identifiers. For example, the communication components 1764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1762, such as, but not limited to, geo-location via Internet Protocol (IP) address, location via Wi-Fi, cellular, NFC, Bluetooth, or other wireless station identification and/or signal triangulation.

In the following, further features, characteristics and advantages of the instant application will be described by means of items:

Item 1. A data processing system comprising:
    at least one processor; and
    a memory in communication with the at least one processor, the memory comprising executable instructions that, when executed by the processor, cause the data processing system to perform functions of:
        receiving an SQL statement for comparing a first trendset to a second trendset over a relation in a database using a scoring function, each of the first and the second trendsets including one or more trends, each of the trends being designated by a constraint and a grouping-measure combination, wherein comparing the first and the second trendsets includes identifying trend pairs for comparison, each of the trend pairs including a trend from the first trendset and a trend from the second trendset having a common grouping-measure combination;

transforming the SQL statement into a basic plan of existing logical operators for performing the SQL statement using a query optimizer;

determining a set of sub-plans based on the basic plan, the set of sub-plans having one sub-plan for each grouping-measure combination, each of the sub-plans including a sequence of group-by aggregate, join and partition operations over one of the respective grouping-measure combinations;

merging pairs of sub-plans from the set of sub-plans by merging group by aggregates and using vertical and horizontal partitioning to generate a set of merged sub-plans;

determining a respective cost for each of the merged sub-plans based on costs of physical operators used to perform each of the merged sub-plans using the query optimizer; and using the merged sub-plan having lowest cost to execute the SQL statement.

Item 2. The data processing system of item 1, wherein the constraint of each the trends is an attribute value used to identify a subset of tuples from the relation, and wherein the grouping-measure combination of each of the trends includes a grouping and a measure, the grouping being an attribute value that designates tuples in the subset of tuples for aggregation, the measure indicating an aggregate function over one or more atributes for performing the aggregation.

Item 3. The data processing system of item 1, wherein the scoring function is an aggregated distance function which returns a scalar-valued score indicative of the comparison of a trend in first trendset with a trend in the second trendset.

Item 4. The data processing system of item 3, wherein the aggregated distance function is used to compute a score for each of the trend pairs, and wherein the scores for the trend pairs are used to select the top k trends with highest or lowest scores.

Item 5. The data processing system of item 4, further comprising:

summarizing each of the trends using a set of three aggregates and a bitmap corresponding to a grouping column;

for each of the trend pairs:
intersecting the bitmaps of the two trends in the trend pair to determine a COUNT of matching tuples between the two trends;
determining an upper bound and a lower bound on the score for the trend pair based on the COUNT and the set of three aggregates for the two trends;
determining a pruning threshold on a lowest possible top k score from the upper bounds and lower bounds of the trend pairs; and
pruning the trend pairs having an upper bound that is less than the pruning threshold.

Item 6. The data processing system of item 5, wherein the three aggregates include a SUM, a MIN and a MAX aggregate.

Item 7. The data processing system of item 1, wherein the SQL statement has a format of COMPARE $[c_1 <\text{-}> c_2]$ $[(g_1, m_1), (g_2, m_2), \ldots, (g_n, m_n)]$ USING $\mathcal{F}$, where c1 is a constraint that is common to the trends in first trendset and c2 is a constraint common to the trends in the second trendset, where $g_1, m_1), (g_2, m_2), \ldots, (g_n, m_n)$ are the grouping-measure combinations over which trends in the first and the second set are compared using scoring function $\mathcal{F}$.

Item 8. A method of executing SQL statements using a database management system (DBMS), the method comprising:

receiving an SQL statement for comparing trends in the first trendset to trends in the second trendset over a relation in a database using a scoring function, each of the first and the second trendsets including one or more trends, each of the trends being designated by a constraint and a grouping-measure combination, wherein comparing the first and the second trendsets includes identifying trend pairs for comparison, each of the trend pairs including a trend from the first trendset and a trend from the second trendset having a common grouping-measure combination;

transforming the SQL statement into a basic plan of existing logical operators for performing the SQL statement using a query optimizer;

determining a set of sub-plans based on the basic plan, the set of sub-plans having one sub-plan for each grouping-measure combination, each of the sub-plans including a sequence of group-by aggregate, join and partition operations over one of the respective grouping-measure combinations;

merging pairs of sub-plans from the set of sub-plans by merging group by aggregates and using vertical and horizontal partitioning to generate a set of merged sub-plans;

determining a respective cost for each of the merged sub-plans based on costs of physical operators used to perform each of the merged sub-plans using the query optimizer; and using the merged sub-plan having lowest cost to execute the SQL statement.

Item 9. The method of item 8, wherein the constraint of each the trends is an attribute value used to identify a subset of tuples from the relation, and wherein the grouping-measure combination of each of the trends includes a grouping and a measure, the grouping being an attribute value that designates tuples in the subset of tuples for aggregation, the measure indicating an aggregate function for performing the aggregation.

Item 10. The method of item 8 wherein the scoring function is an aggregated distance function which returns a scalar-valued score indicative of the comparison of the first trendset and the second trendset.

Item 11. The method of item 10, wherein the aggregated distance function is used to compute a score for each of the trend pairs, and wherein the scores for the trend pairs are used to select the top k trends with highest or lowest scores.

Item 12. The method of item 11, further comprising:

summarizing each of the trends using a set of three aggregates and a bitmap corresponding to a grouping column;

for each of the trend pairs:
intersecting the bitmaps of the two trends in the trend pair to determine a COUNT of matching tuples between the two trends;
determining an upper bound and a lower bound on the score for the trend pair based on the COUNT and the set of three aggregates for the two trends;

determining a pruning threshold on a lowest possible top k score from the upper bounds and lower bounds of the trend pairs; and pruning the trend pairs having an upper bound that is less than the pruning threshold.

Item 13. The method of item 12, wherein the three aggregates include a SUM, a MIN and a MAX aggregate.

Item 14. The method of item 8, wherein the SQL statement has a format of COMPARE $[c_1 <-> c_2]$ $[(g_1, m_1), (g_2, m_2), \ldots, (g_n, m_n)]$ USING $\mathcal{F}$, where c1 is a constraint that is common to the trends in first trendset and c2 is a constraint common to the trends in the second trendset, where $g_1, m_1), (g_2, m_2), \ldots, (g_n, m_n)$ are the grouping-measure combinations over which trends in the first and the second set are compared using scoring function $\mathcal{F}$.

Item 15. A non-transitory computer readable medium on which are stored instructions that, when executed, cause a programmable device to perform functions of:

receiving an SQL statement for comparing a first trendset to a second trendset over a relation in a database using a scoring function, each of the first and the second trendsets including one or more trends, each of the trends being designated by a constraint and a grouping-measure combination, wherein comparing the first and the second trendsets includes identifying trend pairs for comparison, each of the trend pairs including a trend from the first trendset and a trend from the second trendset having a common grouping-measure combination;

transforming the SQL statement into a basic plan of existing logical operators for performing the SQL statement using a query optimizer;

determining a set of sub-plans based on the basic plan, the set of sub-plans having one sub-plan for each grouping-measure combination, each of the sub-plans including a sequence of group-by aggregate, join and partition operations over one of the respective grouping-measure combinations;

merging pairs of sub-plans from the set of sub-plans by merging group by aggregates and using vertical and horizontal partitioning to generate a set of merged sub-plans;

determining a respective cost for each of the merged sub-plans based on costs of physical operators used to perform each of the merged sub-plans using the query optimizer; and using the merged sub-plan having lowest cost to execute the SQL statement.

Item 16. The non-transitory computer readable medium of item 15, wherein the constraint of each the trends is an attribute value used to identify a subset of tuples from the relation, and wherein the grouping-measure combination of each of the trends includes a grouping and a measure, the grouping being an attribute value that designates tuples in the subset of tuples for aggregation, the measure indicating an aggregate function over one or more attributes for performing the aggregation.

Item 17. The non-transitory computer readable medium of item 15, wherein the scoring function is an aggregated distance function which returns a score indicative of the comparison of the first trendset and the second trendset.

Item 18. The non-transitory computer readable medium of item 17, wherein the aggregated distance function is used to compute a score for each of the trend pairs, and wherein the scores for the trend pairs are combined to generate an overall score for the comparison of the comparison.

Item 19. The non-transitory computer readable medium of item 18, further comprising:

summarizing each of the trends using a set of three aggregates and a bitmap corresponding to a grouping column;

for each of the trend pairs:

intersecting the bitmaps of the two trends in the trend pair to determine a COUNT of matching tuples between the two trends;

determining an upper bound and a lower bound on the score for the trend pair based on the COUNT and the set of three aggregates for the two trends;

determining a pruning threshold on a lowest possible top k score from the upper bounds and lower bounds of the trend pairs; and pruning the trend pairs having an upper bound that is less than the pruning threshold.

Item 20. The non-transitory computer readable medium of item 15, wherein the SQL statement has a format of COMPARE $[c_1 <-> c_2]$ $[(g_1, m_1), (g_2, m_2), \ldots, (g_n, m_n)]$ USING $\mathcal{F}$, where c1 is a constraint that is common to the trends in first trendset and c2 is a constraint common to the trends in the second trendset, where $g_1, m_1), (g_2, m_2), \ldots, (g_n, m_n)$ are the grouping-measure combinations over which trends in the first and the second set are compared using scoring function $\mathcal{F}$.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    at least one processor; and
    a memory in communication with the at least one processor, the memory comprising executable instructions that, when executed by the processor, cause the data processing system to perform functions of:
        receiving an SQL statement that identifies a first trendset and a second trendset, each of the first and the second trendsets including one or more trends, each of the trends being designated by a constraint and a grouping-measure combination, and that instructs a database to compare the first trendset and the second trendset over a relation in the database using a scoring function, wherein comparing the first and the second trendsets includes identifying trend pairs for comparison, each of the trend pairs including a trend from the first trendset and a trend from the second trendset having a common grouping-measure combination;
        transforming the SQL statement into a basic plan of existing logical operators for performing the SQL statement using a query optimizer;
        determining a set of sub-plans based on the basic plan, the set of sub-plans having one sub-plan for each grouping-measure combination, each of the sub-plans including a sequence of group-by aggregate, join and partition operations over one of the respective grouping-measure combinations;
        merging pairs of sub-plans from the set of sub-plans by merging group by aggregates and using vertical and horizontal partitioning to generate a set of merged sub-plans;
        determining a respective cost for each of the merged sub-plans based on costs of physical operators used to perform each of the merged sub-plans using the query optimizer; and
        using a merged sub-plan having a lowest cost to execute the SQL statement,
    wherein the constraint of each of the trends is an attribute value used to identify a subset of tuples from the relation, and
    wherein the grouping-measure combination of each of the trends includes a grouping and a measure, the grouping being an attribute value that designates tuples in the subset of tuples for aggregation, the measure indicating an aggregate function over one or more attributes for performing the aggregation.

2. The data processing system of claim 1, wherein the scoring function is an aggregated distance function which returns a scalar-valued score indicative of the comparison of a trend in first trendset with a trend in the second trendset.

3. The data processing system of claim 2, wherein the aggregated distance function is used to compute a score for each of the trend pairs, and
    wherein scores for the trend pairs are used to select top k trends with highest or lowest scores.

4. The data processing system of claim 3, further comprising:
    summarizing each of the trends using a set of three aggregates and a bitmap corresponding to a grouping column;
    for each trend pair:
        intersecting the bitmaps of two trends in the trend pair to determine a COUNT of matching tuples between the two trends;
        determining an upper bound and a lower bound on the score for the trend pair based on the COUNT and the set of three aggregates for the two trends;
    determining a pruning threshold on a lowest possible top k score from the upper bounds and lower bounds of the trend pairs; and
    pruning the trend pairs having an upper bound that is less than the pruning threshold.

5. The data processing system of claim 4, wherein the three aggregates include a SUM, a MIN and a MAX aggregate.

6. The data processing system of claim 1, wherein the SQL statement has a format of COMPARE $[c_1 <\text{->} c_2]$ $[(g_1, m_1), (g_2, m_2), \ldots, (g_n, m_n)]$ USING $\mathcal{F}$, where $c_1$ is a constraint that is common to the trends in the first trendset and $c_2$ is a constraint common to the trends in the second trendset, where $(g_1, m_1), (g_2, m_2), \ldots, (g_n, m_n)$ are the grouping-measure combinations over which the trends in the first trendset and the trends in the second trendset are compared using a scoring function $\mathcal{F}$.

7. A method of executing SQL statements using a database management system (DBMS), the method comprising:
  receiving an SQL statement that identifies a first trendset and a second trendset, each of the first and the second trendsets including one or more trends, each of the trends being designated by a constraint and a grouping-measure combination, and that instructs a database to compare the first trendset and the second trendset over a relation in the database using a scoring function, wherein comparing the first and the second trendsets includes identifying trend pairs for comparison, each of the trend pairs including a trend from the first trendset and a trend from the second trendset having a common grouping-measure combination;
  transforming the SQL statement into a basic plan of existing logical operators for performing the SQL statement using a query optimizer;
  determining a set of sub-plans based on the basic plan, the set of sub-plans having one sub-plan for each grouping-measure combination, each of the sub-plans including a sequence of group-by aggregate, join and partition operations over one of the respective grouping-measure combinations;
  merging pairs of sub-plans from the set of sub-plans by merging group by aggregates and using vertical and horizontal partitioning to generate a set of merged sub-plans;
  determining a respective cost for each of the merged sub-plans based on costs of physical operators used to perform each of the merged sub-plans using the query optimizer; and
  using the merged sub-plan having lowest cost to execute the SQL statement,
  wherein the constraint of each of the trends is an attribute value used to identify a subset of tuples from the relation, and
  wherein the grouping-measure combination of each of the trends includes a grouping and a measure, the grouping being an attribute value that designates tuples in the subset of tuples for aggregation, the measure indicating an aggregate function over one or more attributes for performing the aggregation.

8. The method of claim 7 wherein the scoring function is an aggregated distance function which returns a scalar-valued score indicative of the comparison of the first trendset and the second trendset.

9. The method of claim 8, wherein the aggregated distance function is used to compute the score for each of the trend pairs, and
  wherein scores for the trend pairs are used to select top k trends with highest or lowest scores.

10. The method of claim 9, further comprising:
  summarizing each of the trends using a set of three aggregates and a bitmap corresponding to a grouping column;
  for each trend pair:
    intersecting the bitmaps of two trends in the trend pair to determine a COUNT of matching tuples between the two trends;
    determining an upper bound and a lower bound on the score for the trend pair based on the COUNT and the set of three aggregates for the two trends;
    determining a pruning threshold on a lowest possible top k score from upper bounds and lower bounds of the trend pairs; and
    pruning the trend pairs having an upper bound that is less than the pruning threshold.

11. The method of claim 10, wherein the three aggregates include a SUM, a MIN and a MAX aggregate.

12. The method of claim 7, wherein the SQL statement has a format of COMPARE $[c_1 <\text{-}> c_2]$ $[(g_1, m_1), (g_2, m_2), \ldots, (g_n, m_n)]$ USING $\mathcal{F}$ where $c_1$ is a constraint that is common to the trends in the first trendset and $c_2$ is a constraint common to the trends in the second trendset, where $(g_1, m_1), (g_2, m_2), \ldots, (g_n, m_n)$ are the grouping-measure combinations over which trends in the first trendset and the trends in the second trendset are compared using a scoring function $\mathcal{F}$.

13. A non-transitory computer readable medium on which are stored instructions that, when executed, cause a programmable device to perform functions of:
  receiving an SQL statement that identifies a first trendset and a second trendset, each of the first and the second trendsets including one or more trends, each of the trends being designated by a constraint and a grouping-measure combination, and that instructs a database to compare the first trendset and the second trendset over a relation in the database using a scoring function, wherein comparing the first and the second trendsets includes identifying trend pairs for comparison, each of the trend pairs including a trend from the first trendset and a trend from the second trendset having a common grouping-measure combination;
  transforming the SQL statement into a basic plan of existing logical operators for performing the SQL statement using a query optimizer;
  determining a set of sub-plans based on the basic plan, the set of sub-plans having one sub-plan for each grouping-measure combination, each of the sub-plans including a sequence of group-by aggregate, join and partition operations over one of the respective grouping-measure combinations;
  merging pairs of sub-plans from the set of sub-plans by merging group by aggregates and using vertical and horizontal partitioning to generate a set of merged sub-plans;
  determining a respective cost for each of the merged sub-plans based on costs of physical operators used to perform each of the merged sub-plans using the query optimizer; and
  using the merged sub-plan having lowest cost to execute the SQL statement,
  wherein the constraint of each of the trends is an attribute value used to identify a subset of tuples from the relation, and
  wherein the grouping-measure combination of each of the trends includes a grouping and a measure, the grouping being an attribute value that designates tuples in the subset of tuples for aggregation, the measure indicating an aggregate function over one or more attributes for performing the aggregation.

14. The non-transitory computer readable medium of claim 13, wherein the scoring function is an aggregated distance function which returns a score indicative of the comparison of the first trendset and the second trendset.

15. The non-transitory computer readable medium of claim 14, wherein the aggregated distance function is used to compute the score for each of the trend pairs, and
  wherein the scores for the trend pairs are combined to generate an overall score for the comparison.

16. The non-transitory computer readable medium of claim 15, further comprising:

summarizing each of the trends using a set of three aggregates and a bitmap corresponding to a grouping column;

for each trend pair:
intersecting the bitmaps of two trends in the trend pair to determine a COUNT of matching tuples between the two trends;

determining an upper bound and a lower bound on the score for the trend pair based on the COUNT and the set of three aggregates for the two trends;

determining a pruning threshold on a lowest possible top k score from upper bounds and lower bounds of the trend pairs; and pruning the trend pairs having an upper bound that is less than the pruning threshold.

17. The non-transitory computer readable medium of claim 15, wherein the SQL statement has a format of COMPARE $[c_1 <\!-\!> c_2]$ $[(g_1, m_1), (g_2, m_2), \ldots, (g_n, m_n)]$ USING $\mathcal{F}$, where $c_1$ is a constraint that is common to the trends in the first trendset and $c_2$ is a constraint common to the trends in the second trendset, where $g_1, m_1), (g_2, m_2), \ldots, (g_n, m_n)$ are the grouping-measure combinations over which trends in the first and the trends in the second trendset are compared using a scoring function $\mathcal{F}$.

\* \* \* \* \*